(12) United States Patent
Kobayakawa

(10) Patent No.: US 6,654,618 B2
(45) Date of Patent: Nov. 25, 2003

(54) VARIATION COMPENSATING UNIT

(75) Inventor: Shuji Kobayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 114 days.

(21) Appl. No.: 10/087,682

(22) Filed: Mar. 1, 2002

(65) Prior Publication Data

US 2002/0123372 A1 Sep. 5, 2002

Related U.S. Application Data

(63) Continuation of application No. PCT/JP99/06012, filed on Oct. 28, 1999.

(51) Int. Cl.[7] .................................................. H04B 1/38
(52) U.S. Cl. ................. 455/562; 455/277.1; 455/277.2; 455/278.1; 455/281; 375/347
(58) Field of Search .................... 455/277.1, 277.2, 455/278.1, 281, 562; 375/347

(56) References Cited

U.S. PATENT DOCUMENTS

| | | | |
|---|---|---|---|
| 4,211,979 A | * | 7/1980 | Muraoka et al. ............. 455/306 |
| 5,463,357 A | * | 10/1995 | Hobden ....................... 332/145 |
| 6,058,318 A | * | 5/2000 | Kobayakawa et al. ...... 375/226 |

FOREIGN PATENT DOCUMENTS

| | | |
|---|---|---|
| JP | 61-52812 | 4/1986 |
| JP | 62-173802 | 7/1987 |

* cited by examiner

*Primary Examiner*—Thanh Cong Le
*Assistant Examiner*—Alan T. Gantt
(74) *Attorney, Agent, or Firm*—Katten Muchin Zavis Rosenman

(57) ABSTRACT

A variation compensating unit that compensates an amplitude variation and phase variation efficiently and that improves system reliability and communication quality. A first combining section generates a first combined signal by combining signal on different transmission paths in which a variation has not occurred. A second combining section generates a second combined signal by combining signal on the different transmission paths in which a variation has occurred. A compensation value calculating section calculates compensation values for compensating variation according to the transmission paths on the basis of the first combined signal, the second combined signal, and signal on each transmission path in which a variation has not occurred or in which a variation has occurred. A compensating section compensates variation dynamically on the basis of the compensation values.

18 Claims, 20 Drawing Sheets

VARIATION COMPENSATING UNIT

This is a Continuation of Application No. PCT/JP99/06012, filed Oct. 28, 1999.

BACKGROUND OF THE INVENTION

1. Field of the Invention

This invention relates to a variation compensating unit and, more particularly, to a variation compensating unit for compensating variation including at least one of an amplitude variation and phase variation which will occur in the case of transmitting signals via transmission paths.

2. Description of the Related Art

In recent years attention has been riveted on cellular mobile communication systems in which digital signal processing is performed on signals to be transmitted or received by locating a plurality of antenna elements, such as multiple beam antennas or adaptive array antennas, at a radio base station.

FIG. 18 is a schematic view showing the structure of a system using an adaptive array antenna. FIG. 18 shows the structure of a receiving section. In this example, four antennas 101a through 101d are located on transmission paths respectively. On the first transmission path, a low-noise amplifier (LNA) 102a, frequency converters 103 and 105, an amplifier 104a, an A/D converter 106a, a multiplier 107a, and a combining section 108 are located. On the second transmission path, a low-noise amplifier (LNA) 102b, the frequency converters 103 and 105, an amplifier 104b, an A/D converter 106b, a multiplier 107b, and the combining section 108 are located. On the third transmission path, a low-noise amplifier (LNA) 102c, the frequency converters 103 and 105, an amplifier 104c, an A/D converter 106c, a multiplier 107c, and the combining section 108 are located. On the fourth transmission path, a low-noise amplifier (LNA) 102d, the frequency converters 103 and 105, an amplifier 104d, an A/D converter 106d, a multiplier 107d, and the combining section 108 are located. The frequency converters 103 and 105 include a local oscillator (LO) and mixers.

Signals are received by the antenna 101a and are transmitted to the LNA 102a. Signals output from the LNA 102a, the amplitude of which is far higher than that of the original signals, are converted from RF signals into IF signals by the frequency converter 103. These IF signals are amplified by the amplifier 104a, are converted into base band signals by the frequency converter 105, are converted into digital signals by the A/D converter 106a, and are given weight W by the multiplier 107a. This is the same with the antennas 101b through 101d. The weighted signals are combined by the combining section 108. Received (or transmitted) signals are expressed as functions of complex variables with amplitude as a and phase as θ.

FIG. 19 is a view showing a beam pattern obtained by an array antenna. As shown in FIG. 18, it is assumed that radio signals which arrive from direction ψ to the antennas 101a through 101d are received. There arise path differences among the antennas 101a through 101d. These path differences are expressed as A1 through A3, respectively, with the antenna 101a as a standard. These path differences will lead to phase differences. The radio signals are weighted by the multipliers 107a through 107d so that these phase differences will be canceled out, and then are combined by the combining section 108. Signals output from the combining section 108 are equivalent to signals received as beam pattern B1 shown in FIG. 19.

Beam pattern B1 obtained by receiving with an adaptive array antenna and beam pattern B2 obtained by receiving with one antenna will now be compared. It is assumed that desired user signals arrive from direction ψ, that interference user signals arrive from direction η, that the levels of the desired and interference user signals received as the beam pattern B1 are P1 and P2 respectively, and that the levels of the desired and interference user signals received as the beam pattern B2 are P3 and P4 respectively. With the beam pattern B2, the difference in level (La) between P3 and P4 is small, but, with the beam pattern B1, the difference in level (Lb) between P1 and P2 is significant. Therefore, the beam pattern B1 gives greater S/I than the beam pattern B2.

That is to say, with cellular mobile communication systems in which multiple beam antennas, adaptive array antennas, or the like are used, a beam pattern equivalently becomes sharp. As a result, interference in areas can be reduced. In addition, higher gain is obtained, so the number of users who can be accommodated in one cell can be increased.

In order to realize beam forming by the above system, nonlinear elements, such as the LNAs 102a through 102d and mixers, are needed on the receiving side for converting RF signals received by the antennas 101a through 101d into base band signals, as shown in FIG. 18.

Moreover, on the transmitting side (a transmitting section is not shown), nonlinear elements, such as mixers for converting base band signals into IF signals, then into RF signals and a high power amplifier (HPA) for RF signals, are needed on each antenna branch.

However, these nonlinear elements included in each circuit differ in characteristic. Their characteristics also change according to environmental conditions, such as temperature, and input levels and suffer aged deterioration. As a result, amplitude and phase variations differ among different antenna branches, so efficient beam forming cannot be performed. This will lead to degradation in characteristic.

Compensating these amplitude and phase variations therefore is essential for the introduction of a multiple beam antenna or adaptive array antenna.

Conventionally, calibration between antenna branches has usually been performed on regular basis (once a day, for example).

Alternatively, there is the prior art of compensating amplitude and phase variations on each antenna branch by sending a pilot signal. FIG. 20 is a view for describing the prior art.

Circuits 110a through 110d each including various nonlinear elements (LNAs, mixers, and the like) are located on four transmission paths respectively. The antennas 101a through 101d are also located on these transmission paths respectively.

As shown in FIG. 20, pilot signal $a \cdot \exp(j\theta)$ is sent to the antennas 101a through 110d from a direction so that phase differences will not arise. It is assumed that signals which are processed in and output from the circuits 110a through 110d are $a1 \cdot \exp(j\theta1)$ through $a4 \cdot \exp(j\theta4)$.

The value of the ratio of signal $a1 \cdot \exp(j\theta1)$ output from the branch on which the antenna 101a is located and signal $a2 \cdot \exp(j\theta2)$ output from the branch on which the antenna 101b is located is $(a1/a2) \cdot \exp[j(\theta1-\theta2)]$. By multiplying this value and the original signal $a2 \cdot \exp(j\theta2)$, which is output from the branch on which the antenna 101b is located, together, $a1 \cdot \exp(j\theta1)$ is obtained. That is to say, the amplitude and phase variation between the branch on which the antenna 110a is located and the branch on which the antenna 101b is located are compensated. This value therefore should be used as a compensation value for the branch on which the antenna 101b is located. This is the same with the other branches.

Conventionally, such a compensation value has been calculated for each antenna branch by the use of a pilot signal to compensate an amplitude variation and phase variation.

However, with the above conventional method in which calibration between antenna branches is performed on regular basis, beam forming will be performed on the basis of uncertain compensation conditions because of dynamic amplitude and phase variations. As a result, the reliability of a system is low.

On the other hand, with the above conventional method in which a pilot signal is used, a dedicated unit for generating a pilot signal must be located in all of the cells or sectors, resulting in a heavy economic burden.

Further, this pilot signal will become an interference source. In that case, a circuit for performing the above operation needs to be located in order to process a pilot signal, being an interference source. This will make a system inefficient.

SUMMARY OF THE INVENTION

The present invention was made under the background circumstances as described above. An object of the present invention is to provide a variation compensating unit for improving system reliability and communication quality by compensating amplitude and phase variation efficiently.

To achieve the above object, according to the present invention, there is provided a variation compensating unit for compensating variation including at least one of an amplitude variation and phase variation which will occur in the case of transmitting signals via transmission paths, the unit comprising: a first combining section for generating a first combined signal by combining signals on different transmission paths in which the variation has not occurred; a second combining section for generating a second combined signal by combining signals on the different transmission paths in which the variation has occurred; a compensation value calculating section for calculating compensation values for compensating the variation according to the transmission paths on the basis of the first combined signal, the second combined signal, and the signals on the different transmission paths in which the variation has not occurred or in which the variation has occurred; and a compensating section for compensating the variation dynamically on the basis of the compensation values.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
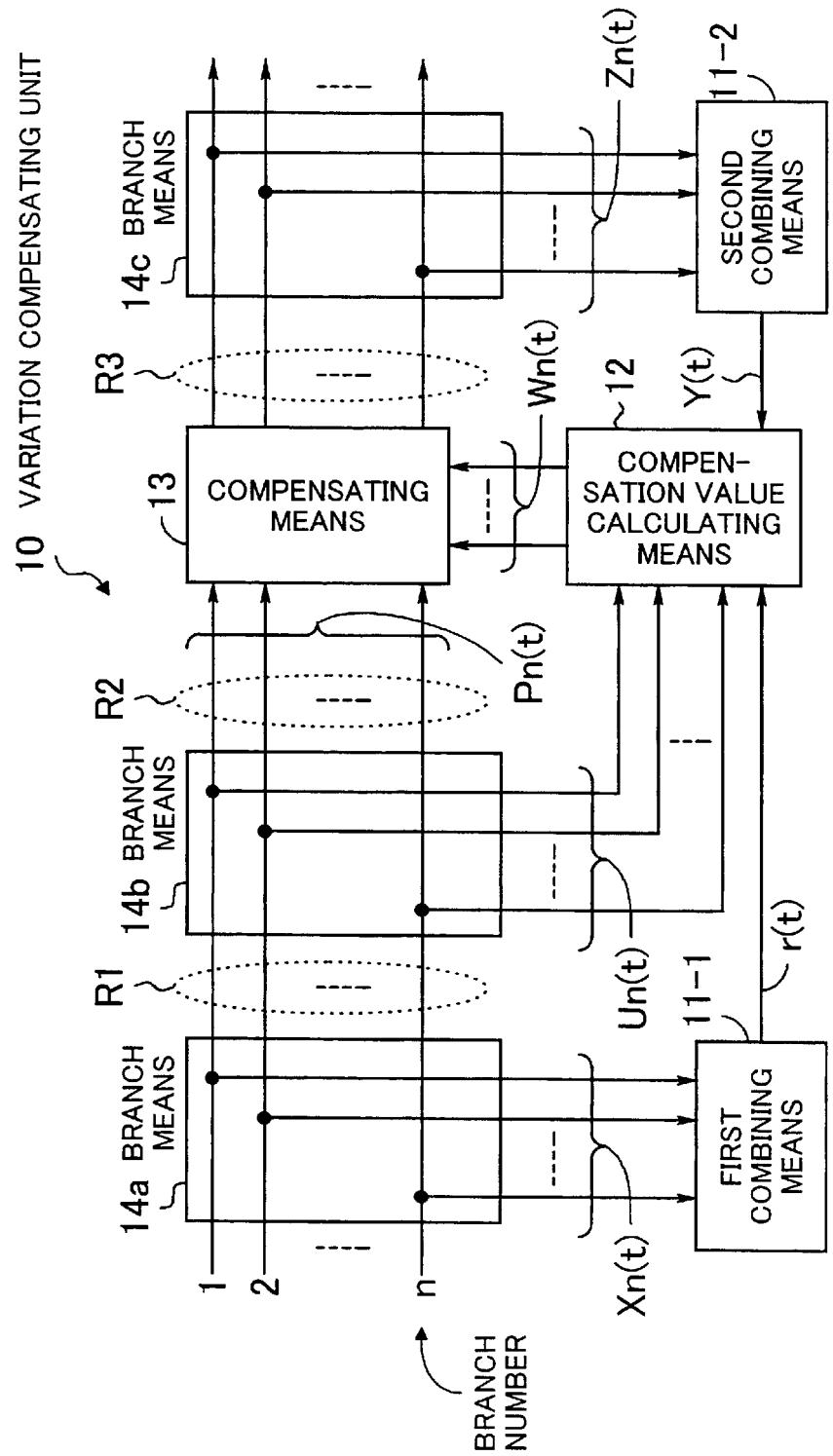
FIG. 1 is a view for describing the principles underlying a variation compensating unit according to the present invention.

Embodiments of the present invention will now be described with reference to the drawings. FIG. 1 is a view for describing the principles underlying a variation compensating unit according to the present invention. A variation compensating unit 10 compensates variation including an amplitude variation and phase variation, which will occur on a plurality of transmission paths (branches) in the case of transmitting a plurality of signals in parallel via the transmission paths, according to the transmission paths.

Branch means 14a causes a signal on each transmission path in which a variation has not occurred to branch and outputs signal Xn(t) (where n and t indicate a branch number and time respectively) to first combining means 11-1. The first combining means 11-1 combines signal Xn(t) to generate first combined signal r(t).

Branch means 14c causes a signal on each transmission path in which a variation has occurred to branch and outputs signal Zn(t) to second combining means 11-2. The second combining means 11-2 combines signal Zn(t) to generate second combined signal Y(t). The first and second combining means 11-1 and 11-2 use the same combining method.

Branch means 14b causes a signal on each transmission path to branch and outputs signal Un(t). Compensation value calculating means 12 calculates compensation value Wn(t) for compensating variation according to transmission paths on the basis of first combined signal r(t), second combined signal Y(t), and signal Un(t) in which a variation has not occurred or in which a variation has occurred.

Compensating means 13 dynamically compensates a variation corresponding to each transmission path on the basis of compensation value Wn(t) for each transmission path. At least one of areas R1 through R3 shown in FIG. 1 is an area where a variation will occur. In the present invention, a variation which occurs in any of these areas can be compensated.

Operation will now be described. The branch means 14a causes a signal on each transmission path to branch and inputs signal Xn(t) to the first combining means 11-1. At this time, a variation has not occurred on each transmission path. The first combining means 11-1 combines signal Xn(t) by the use of weight Vn to generate signal r(t). The signal r(t) is given by $$r(t) = \sum_{n=1}^{N} Xn(t) \cdot Vn \quad (1)$$

where N is the number of branches and n is a branch number. The branch means 14c causes a signal on each transmission path to branch and inputs signal Zn(t) to the second combining means 11-2. This signal Zn(t) is the signal which is affected by variations of one of areas R1 through R3 shown in FIG. 1 and compensated by calibration weight for each transmission.

The second combining means 11-2 combines the signal Zn(t) by the use of weight Vn, which is the same with the first combining means 11-1, to generate signal Y(t). The signal Y(t) is given by $$Y(t) = \sum_{n=1}^{N} Zn(t) \cdot Vn \quad (2)$$

The branch means 14b causes a signal on each transmission path to branch and inputs signal Un(t), in which a variation has not occurred or in which a variation has occurred, to the compensation value calculating means 12.

The compensation value calculating means 12 sequentially performs operations shown by equations (3) and (4) by the use of the above input signals r(t), Y(t), and Un(t), calculates a compensation weight corresponding to a variation which occurs on each transmission path, and outputs it to the compensating means 13.

$$Wn(t+\Delta t)=Wn(t)+\mu \cdot U^*n(t)\cdot e(t) \quad (3)$$

$$e(t)=r(t)-Y(t) \quad (4)$$

Where $\mu$ is a step size, $\Delta t$ is a compensation interval, and A* is the conjugate complex number of A.

The compensating means 13 makes compensation shown by equation (5) by the use of the compensation value Wn(t) calculated by the compensation value calculating means 12.

$$xn(t)=Wn(t)\cdot Pn(t) \quad (5)$$

where xn(t) is a signal transmitted via the nth path on which a variation has been compensated, and Pn(t) is a signal on each transmission path input to the compensating means 13. Whether a variation has occurred in this Pn(t) depends on the location of the compensating means 13 in a system.

As described above, the variation compensating unit 10 according to the present invention updates compensation weight in compliance with algorithm which minimizes error e(t) between the first combined signal r(t) in which a variation has not occurred and the second combined signal Y(t) in which a variation has occurred. That is to say, in the present invention, the minimum mean square error (MMSE) method, such as the least mean square (LMS), can be used as algorithm.

Usually there is individual difference, including errors at the time of manufacture, among nonlinear elements, such as circuits for frequency conversion, amplification, etc., located on transmission paths. In addition, these nonlinear elements undergo aged deterioration and their characteristics change according to, for example, temperature. As a result, variations differ among different transmission paths. However, in the present invention, these dynamic variations can be compensated efficiently in real time.

Now, an embodiment in which the variation compensating unit 10 according to the present invention is applied to an array antenna system will be described.

Figure 2:
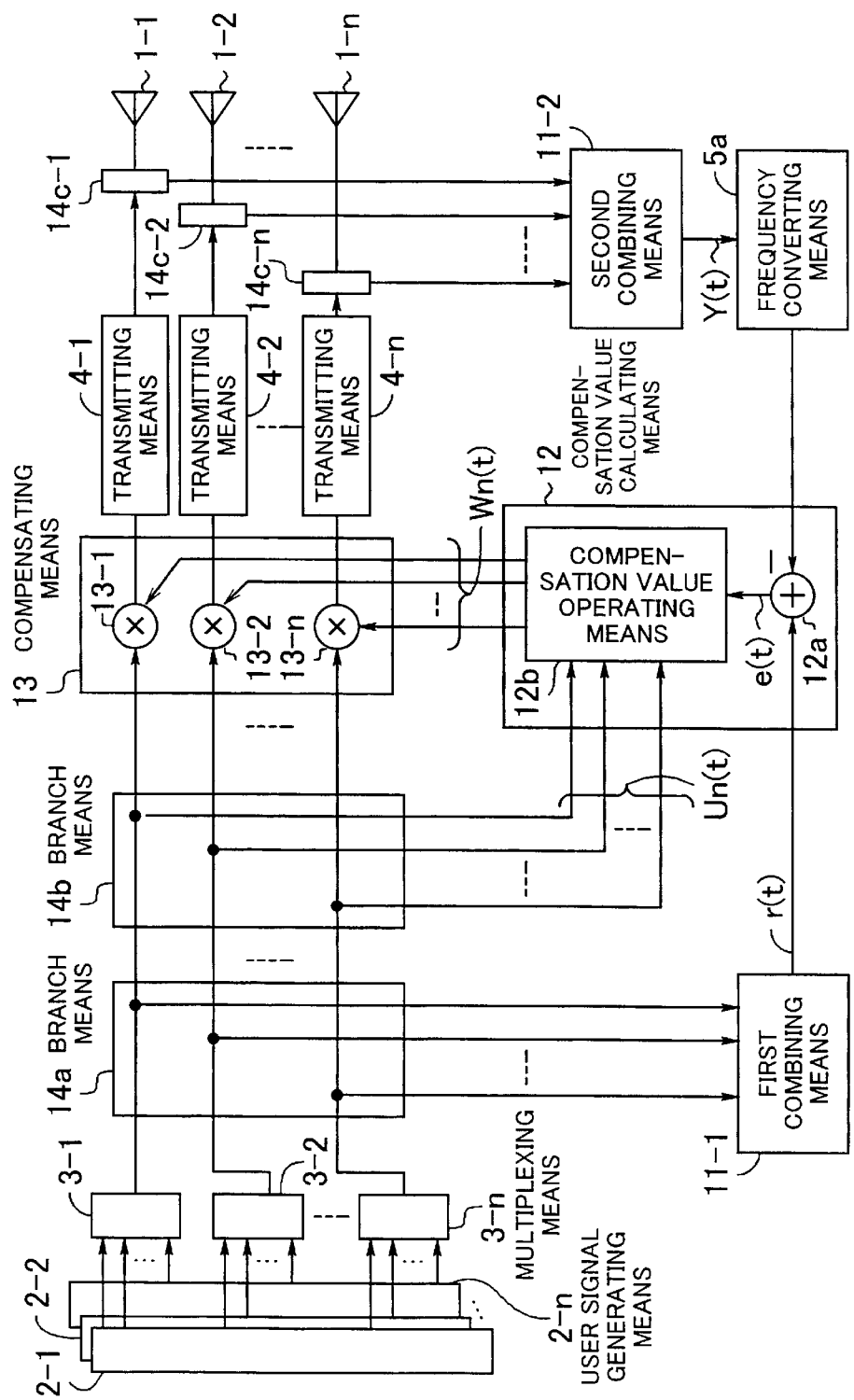
FIG. 2 is a view showing a first embodiment of the present invention.

FIG. 2 is a view showing a first embodiment of the present invention. A downlink (transmitting-system) array antenna system with a built-in variation compensating unit 10 is shown. The same means that was described above will be marked with the same number and descriptions of it will be omitted.

User signal generating means 2-1 through 2-n generate user signals on each branch. Multiplexing means 3-1 through 3-n generate multiplexed signals by multiplexing user signals on each branch. Transmitting means 4-1 through 4-n perform the processes of D/A conversion, frequency conversion, amplification, etc. on multiplexed signals. Signals processed by the transmitting means 4-1 through 4-n are transmitted from antennas 1-1 through 1-n respectively.

In this case, nonlinear elements are used in the transmitting means 4-1 through 4-n, so variations differ among different antenna branches. These variations occur dynamically according to the level of input signals and with time, so they need to be compensated in real time.

Variation has not occurred in multiplexed signals on the branches before they enter the transmitting means 4-1 through 4-n. In addition, these multiplexed signals are digital ones before they enter the transmitting means 4-1 through 4-n. The branch means 14a causes a signal on each antenna branch to branch. First combining means 11-1 generates a signal by combining signals on all of the antenna branches by, for example, a method for combining signals with the same phase and equal amplitude. This combined signal is reference signal r(t) (equation (1)) without an amplitude variation and phase variation.

On the other hand, signals which branched from antenna branches at directional couplers 14c-1 through 14c-n are combined by the second combining means 11-2 to generate combined signal Y(t) (equation (2)). In this case, the same method that the first combining means 11-1 used will be used.

Combined signal Y(t) is generated by combining all of the signals on the antenna branches in which a variation has occurred. If a variation does not occur in signals in the transmitting means 4-1 through 4-n, there is a strong correlation between Y(t) and combined signal r(t). That is to say, the value of a correlation coefficient is 1.

In this case, the transmitting means 4-1 through 4-n perform frequency conversion. Therefore, frequency converting means 5a converts combined signal Y(t) into digital base band signals in order to compare combined signal Y(t) and combined signal r(t).

Compensation value calculating means 12 includes subtraction operating means 12a and compensation value operating means 12b. The subtraction operating means 12a calculates the difference between combined signal r(t) and digital base band signals obtained by converting combined signal Y(t) and outputs it as error signal e(t) (equation (4)).

The compensation value operating means 12b sequentially calculates compensation value Wn(t) for a variation on each antenna branch by the use of error signal e(t) and signal Un(t), which branched off from a signal on each antenna branch at branch means 14b, in accordance with equation (3).

Compensating means 13 including multipliers 13-1 through 13-n makes compensation shown by equation (5) by the use of compensation value Wn(t) to compensate amplitude and phase variation.

Figure 3:
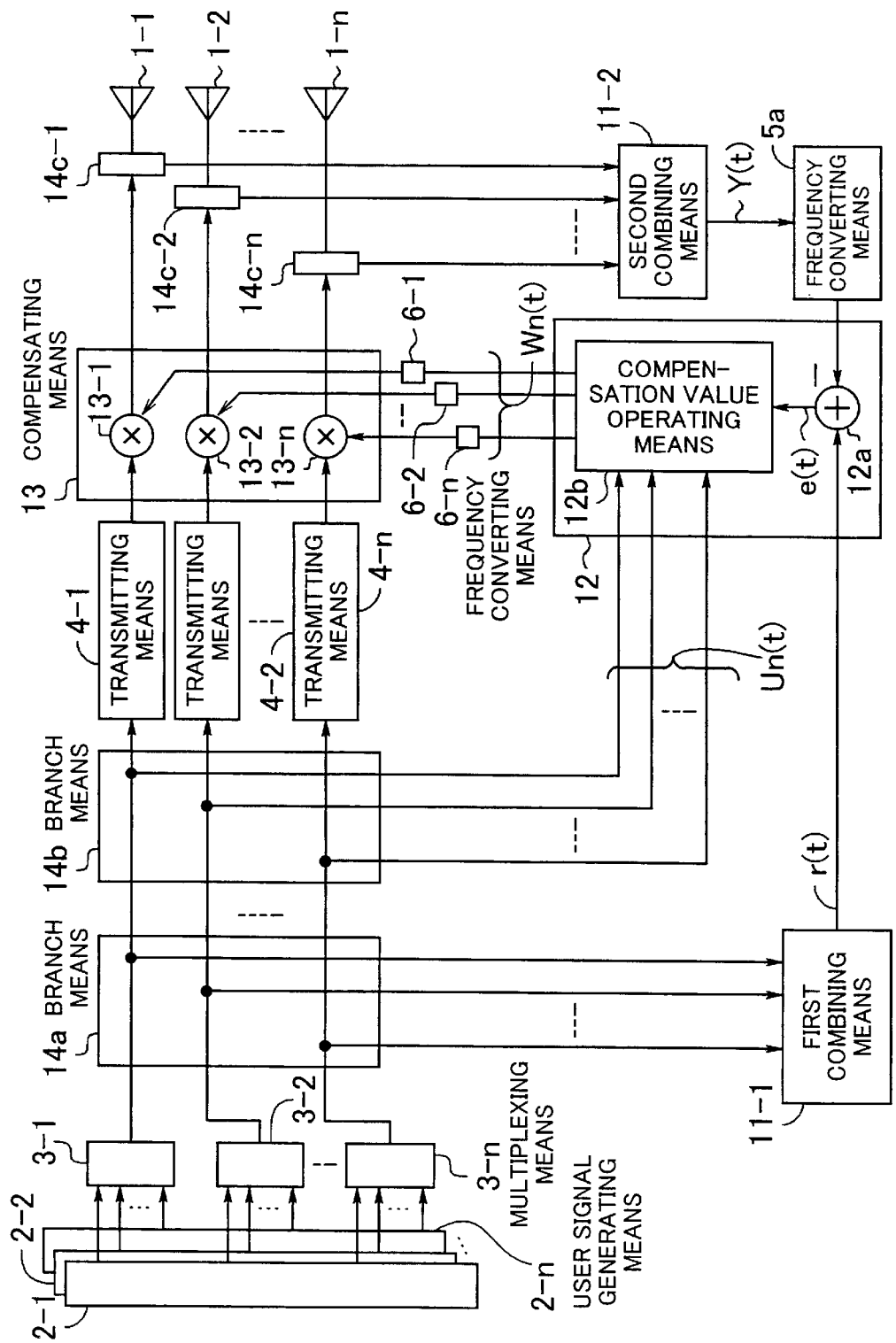
FIG. 3 is a view showing a second embodiment of the present invention.

Now, a second embodiment will be described. FIG. 3 is a view showing a second embodiment of the present invention. A downlink (transmitting-system) array antenna system with a built-in variation compensating unit 10 is shown. The same means that was described above will be marked with the same number and descriptions of it will be omitted.

The second embodiment differs from the first embodiment shown in FIG. 2 in that compensating means 13 is located at the output stages of transmitting means 4-1 through 4-n. That is to say, compensation will be made after variation has occurred.

In this case, the compensating means 13 performs a process on RF signals and compensation value operating means 12b performs the process of calculating compensation values on digital base band signals. Frequency converting means 6-1 through 6-n is therefore located at the output stage of the compensation value operating means 12b to convert compensation value Wn(t) into RF signals.

Figure 4:
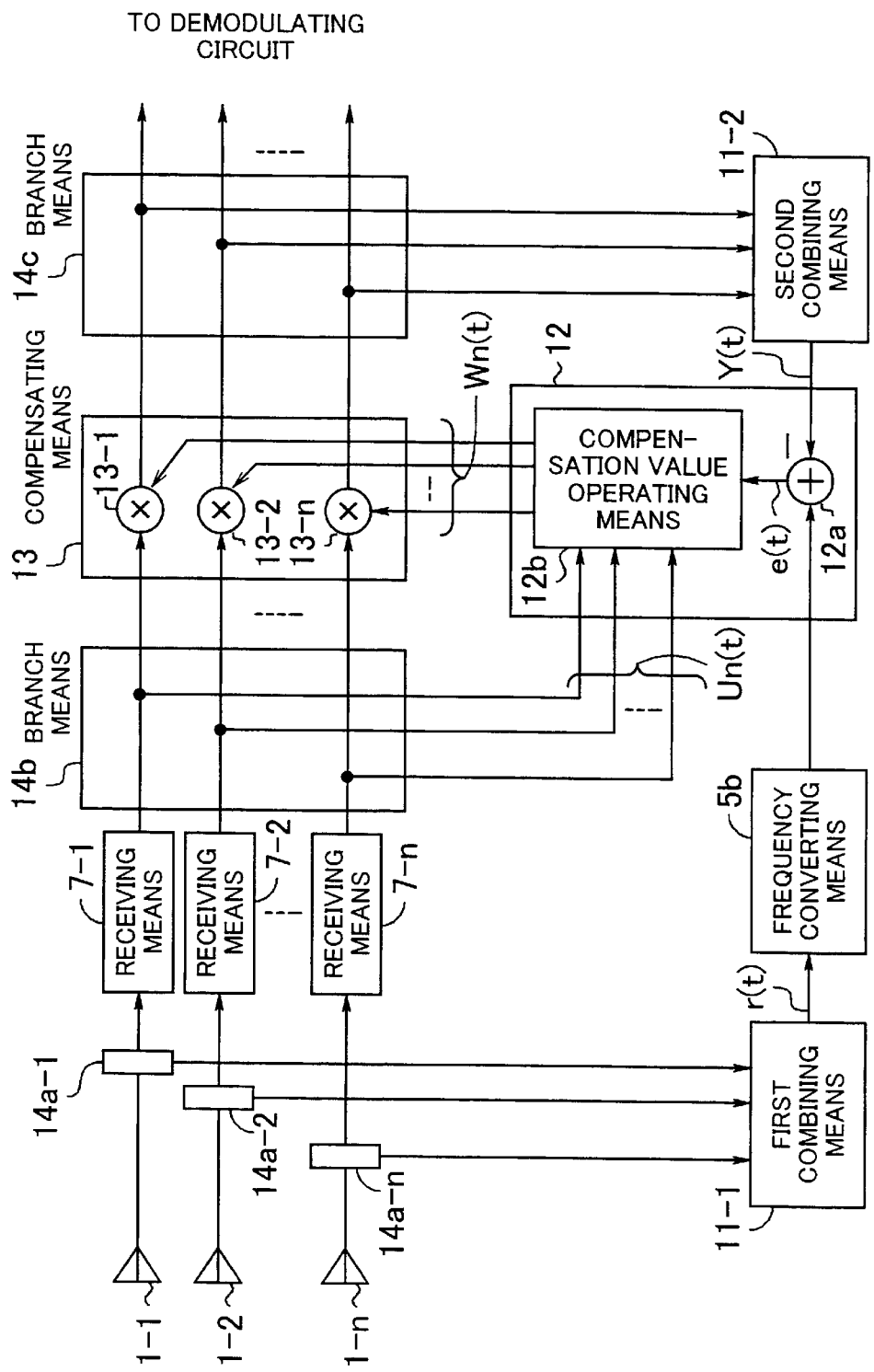
FIG. 4 is a view showing a third embodiment of the present invention.

Now, a third embodiment will be described. FIG. 4 is a view showing a third embodiment of the present invention. An uplink (receiving-system) array antenna system with a built-in variation compensating unit 10 is shown. The same means that was described above will be marked with the same number and descriptions of it will be omitted.

Antennas 1-1 through 1-n receive signals. receiving means 7-1 through 7-n converts the signals into digital base band ones by performing the processes of amplification, frequency conversion, A/D conversion, etc. and inputs them to a demodulating circuit (not shown).

In this case, nonlinear elements are used in the receiving means 7-1 through 7-n, so variations differ among different antenna branches. These variations occur dynamically according to the level of input signals and with time, so they need to be compensated in real time.

Directional couplers 14a-1 through 14a-n cause signals received by the antennas 1-1 through 1-n to branch. The first combining means 11-1 generates a signal by combining signals on all of the antenna branches by, for example, a method for combining signals with the same phase and equal amplitude. This combined signal is reference signal r(t) (equation (1)) without an amplitude variation and phase variation.

On the other hand, signals on antenna branches branch to second combining means 11-2 at branch means 14c. The second combining means 11-2 combines signals by the same method that is used by the first combining means 11-1 to generate combined signal Y(t) (equation (2)).

Signals at the input stages of the receiving means 7-1 through 7-n are RF signals. Therefore, these RF signals are converted into digital base band ones by locating frequency converting means 5b at the output stage of the first combining means 11-1 in order to compare reference signal r(t) and combined signal Y(t) output from the second combining means 11-2. A series of processes from calculating compensation values to compensation were described above, so descriptions of them will be omitted.

Figure 5:
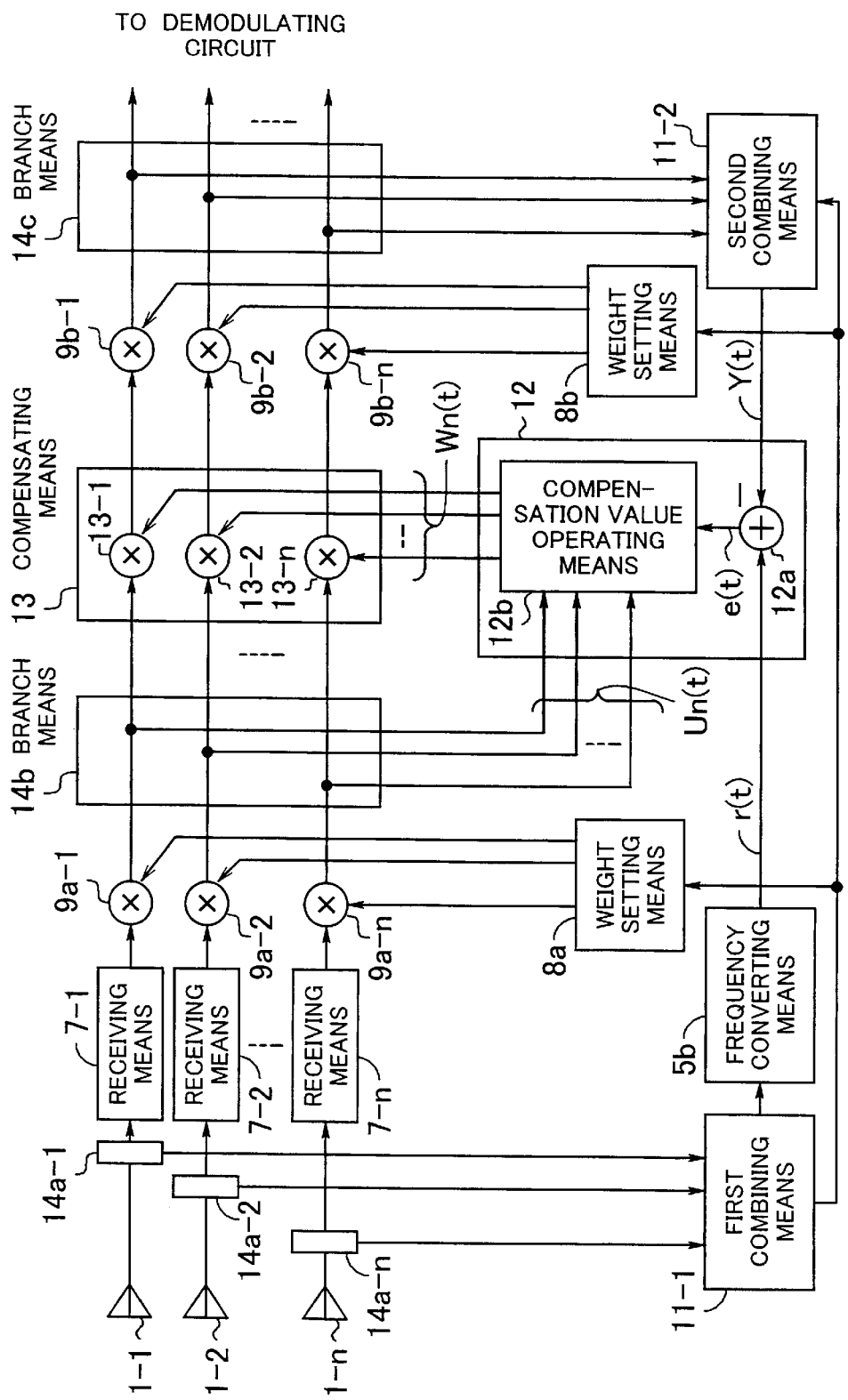
FIG. 5 is a view showing a fourth embodiment of the present invention.

Now, a fourth embodiment will be described. FIG. 5 is a view showing a fourth embodiment of the present invention. An uplink (receiving-system) array antenna system with a built-in variation compensating unit 10 is shown. The same means that was described above will be marked with the same number and descriptions of it will be omitted.

In the fourth embodiment, first combining means 11-1 informs weight setting means 8a and 8b and second combining means 11-2 about weight the first combining means 11-1 used for combining.

The weight setting means 8a outputs weight about which the first combining means 11-1 informed the weight setting means 8a to multiplying means 9a-1 through 9a-n. The weight setting means 8b outputs the reciprocal of weight about which the first combining means 11-1 informed the weight setting means 8b to multiplying means (corresponding to inverse operation means) 9b-1 through 9b-n.

Each of the multiplying means 9a-1 through 9a-n is located on a branch and multiplies weight output from the weight setting means 8a and a signal on the branch together. Each of the multiplying means 9b-1 through 9b-n is located on a branch and performs an inverse operation by multiplying the reciprocal of weight output from the weight setting means 8b and a signal on the branch together.

The second combining means 11-2 generates a combined signal on the basis of weight about which the first combining means 11-1 informed the second combining means 11-2. The first and second combining means 11-1 and 11-2 will use the same combining method.

As described above, to compensate variation, the first combining means 11-1 informs the weight setting means 8a and 8b and second combining means 11-2 about a combining method (combination weight) the first combining means 11-1 used. This makes it possible to deal with any combining method flexibly.

The same effect will be obtained by locating the weight setting means 8a and multiplying means 9a-1 through 9a-n at the input stages of receiving means 7-1 through 7-n. In this case, a multiplication process will be performed on RF signals.

Figure 6:
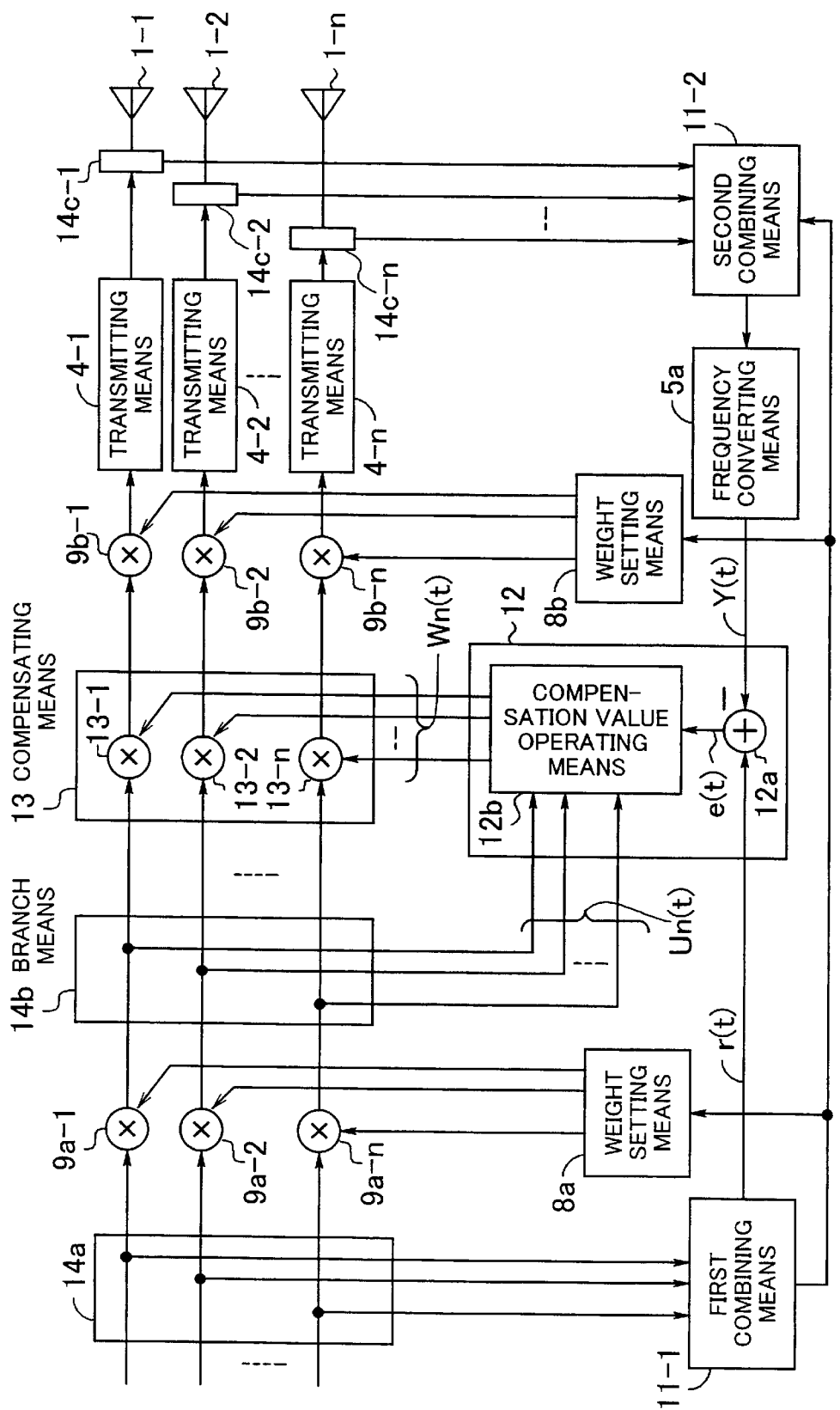
FIG. 6 is a view showing a fifth embodiment of the present invention.

Now, a fifth embodiment will be described. FIG. 6 is a view showing a fifth embodiment of the present invention. In the fifth embodiment, the fourth embodiment shown in FIG. 5 is applied to a transmitting-system array antenna system. Its basic structure and operation are the same with the fourth embodiment, so descriptions of them will be omitted.

Figure 7:
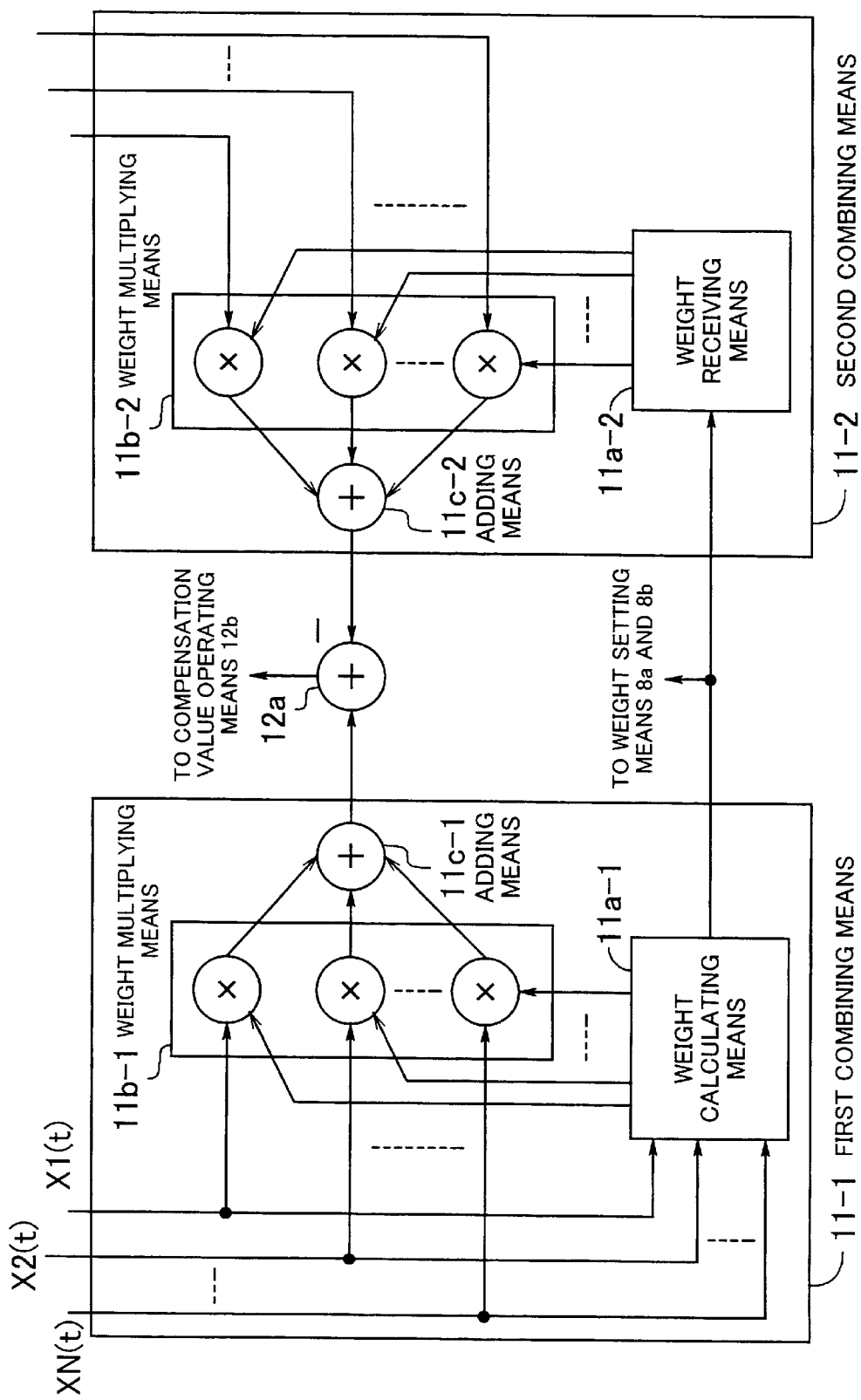
FIG. 7 is a view showing the structure of first and second combining means.

Now, the first and second combining means 11-1 and 11-2 will be described. FIG. 7 is a view showing the structure of the first and second combining means 11-1 and 11-2.

Weight calculating means 11a-1 calculates a weight to be given to weight multiplying means 11b-1 so that combined output will be higher than or equal to a certain level. The weight multiplying means 11b-1 multiplies a weight given by the weight calculating means 11a-1 and signal Xn(t) together. Adding means 11c-1 adds signals calculated by the weight multiplying means 11b-1 and outputs the result to subtraction operating means 12a in compensation value calculating means 12.

Weight receiving means 11a-2 receives a weight from the weight calculating means 11a-1. Weight multiplying means 11b-2 multiplies a weight given by the weight receiving means 11a-2 and signal Zn(t) together. Adding means 11c-2 adds signals calculated by the weight multiplying means 11b-2 and outputs the result to the subtraction operating means 12a in the compensation value calculating means 12.

Procedures for updating weight will now be described. Signals X1(t) through XN(t) corresponding to each antenna branch which enter the first combining means 11-1 are defined as follows:

$$X1(t)=A1(t)\cdot\exp[j\alpha_1(t)] \quad (6\text{-}1)$$

$$X2(t)=A2(t)\cdot\exp[j\alpha_2(t)] \quad (6\text{-}2)$$

$$XN(t)=AN(t)\cdot\exp[j\alpha_N(t)] \quad (6\text{-}n)$$

where A1(t) through AN(t) are amplitude on transmission paths respectively, α1(t) through αN(t) are phases on the transmission paths respectively, and N is the number of branches.

Now, calculations are performed with X1(t) as a reference in accordance with the equation:

$$Y1n(t)=Xn(t)\cdot X^*1(t)=AN(t)\cdot A1(t)\cdot\exp[j(\alpha_N(t)-\alpha_1(t))] \quad (7)$$

where n indicates the nth branch. A phase term corresponding to the nth branch is extracted as follows:

$$\Phi_n(t)=arg(Y1n(t))=\alpha_n(t)-\alpha_1(t) \quad (8)$$

The weight calculating means 11a-1 calculates the amount of a phase corresponding to each transmission path, shown by equation (9), by the use of equation (8) and outputs it.

$$\beta_n(t)=\exp[-j\Phi_n(t)] \quad (9)$$

This phase rotation is given to each branch and signals on transmission paths are combined by the adding means 11c-1 in accordance with the equation:

$$G(t) = \sum_{n=1}^{N} Xn(t)\cdot\beta_n(t) \quad (10)$$

This information regarding combination weight is sent to the weight receiving means 11a-2. The weight receiving means 11a-2 gives the same combination weight to the weight multiplying means 11b-2. The weight multiplying means 11b-2 multiplies this combination weight and a signal on each branch, in which a variation has occurred, together. Signals output from the weight multiplying means 11b-2 are combined by the adding means 11c-2. This information is also sent to weight setting means 8a and 8b and the same or inverse operation will be performed.

Figure 8:
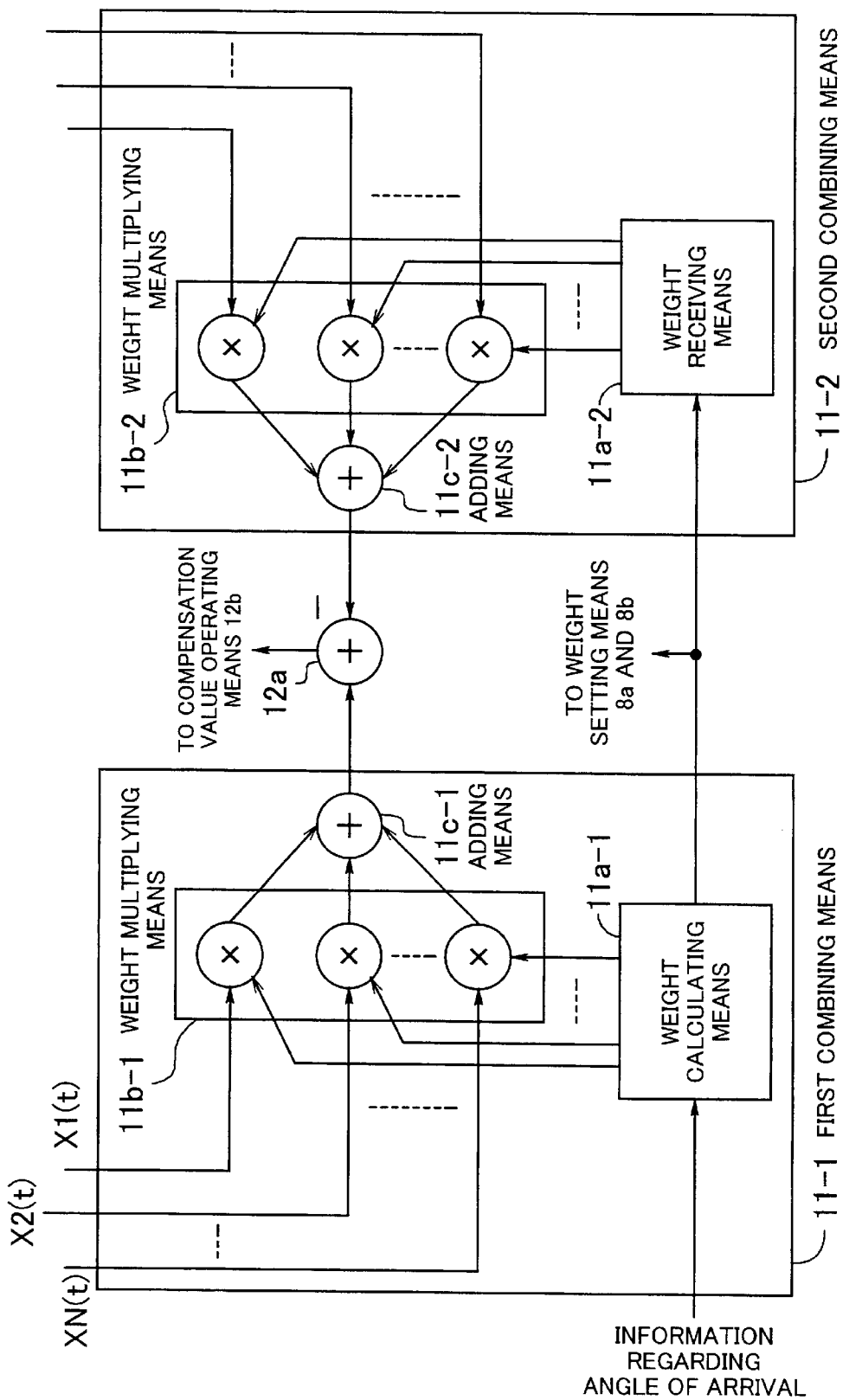
FIG. 8 is a view showing the structure of a first modification of the first and second combining means.

Now, a first modification of the first and second combining means 11-1 and 11-2 will be described. FIG. 8 is a view showing the structure of a first modification of the first and second combining means 11-1 and 11-2. In the first modification, it is assumed that the arrival angle of an arbitrary user signal is known.

Then beam forming mainly for a downlink can be realized easily. Usually beam forming for a downlink is performed in the following way. An arrival angle is estimated from a user signal on a uplink. Weight for beam forming for a downlink is determined so that the beam will be sent in that direction. This direction for a downlink is known to a base station.

Weight calculating means 11a-1 calculates weight shown by equation (11) from information regarding an arrival angle and gives the weight to weight multiplying means 11b-1.

$$W(t)=[1, \exp(-jkd\sin\theta(t), \exp(-jk2d\sin\theta(t), \ldots, \exp(-jk(N-1)d\sin\theta(t)] \quad (11)$$

where K is $2\pi/\lambda$ ($\lambda$ is a free space wavelength for a downlink), d is an interval between antennas, θ(t) is the arrival angle of an arbitrary user signal, and N is the number of antennas.

This information regarding combination weight is sent to weight receiving means 11a-2. The weight receiving means 11a-2 gives the same combination weight to weight multiplying means 11b-2. The weight multiplying means 11b-2 multiplies this combination weight and a signal on each branch, in which a variation has occurred, together. Signals output from the weight multiplying means 11b-2 are combined by adding means 11c-2. This information is also sent to weight setting means 8a and 8b and the same or inverse operation will be performed.

This will keep the level of combined output from first and second combining means 11-1 and 11-2 high and subtraction operating means 12a calculates an error signal by the use of these signals. Therefore, compared with a system in which a fixed combining method is used, amplitude and phase variation can be compensated more reliably.

Figure 9:
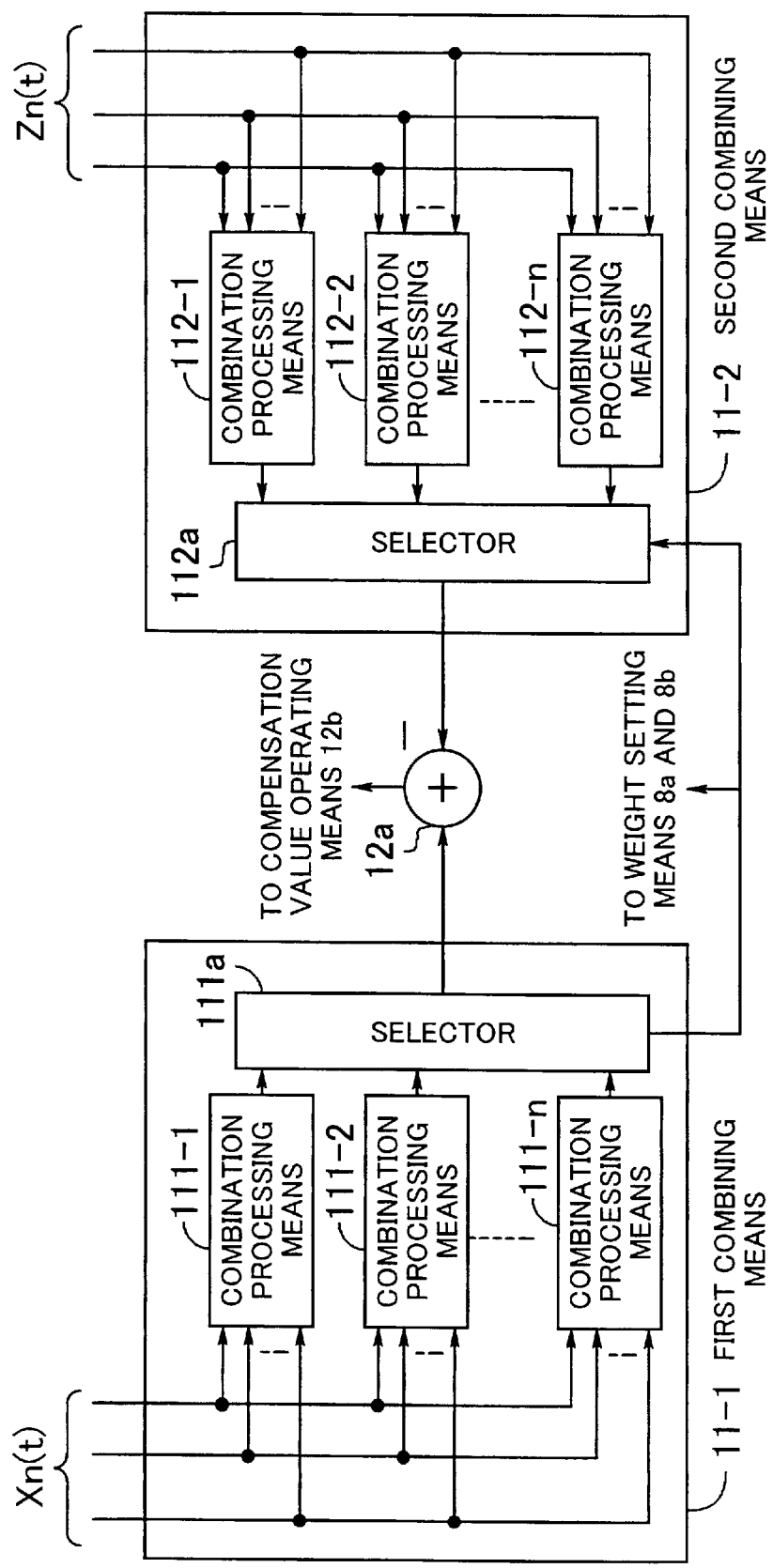
FIG. 9 is a view showing the structure of a second modification of the first and second combining means.

Now, a second modification of the first and second combining means 11-1 and 11-2 will be described. FIG. 9 is a view showing the structure of a second modification of the first and second combining means 11-1 and 11-2. Combination processing means 111-1 through 111-n combines signal Xn(t) by different methods.

Combination processing means 112-1 through 112-n corresponds to the combination processing blocks of the combination processing means 111-1 through 111-n respectively and combines signal Zn(t).

A selector 111a selects, for example, a signal the level of which is the highest from among combined signals output from the combination processing means 111-1 through 111-n and outputs it to subtraction operating means 12a. Moreover, the selector 111a informs a selector 112a and weight setting means 8a and 8b of this information.

The selector 112a selects a combination processing block corresponding to (being the same as) combination processing means selected from among the combination processing means 111-1 through 111-n from among the combination processing means 112-1 through 112-n on the basis of information given and outputs a combined signal output from it to the subtraction operating means 12a.

As a result, any combined output can be selected from among a plurality of combining processes, resulting in a more flexible combining process.

Figure 10:
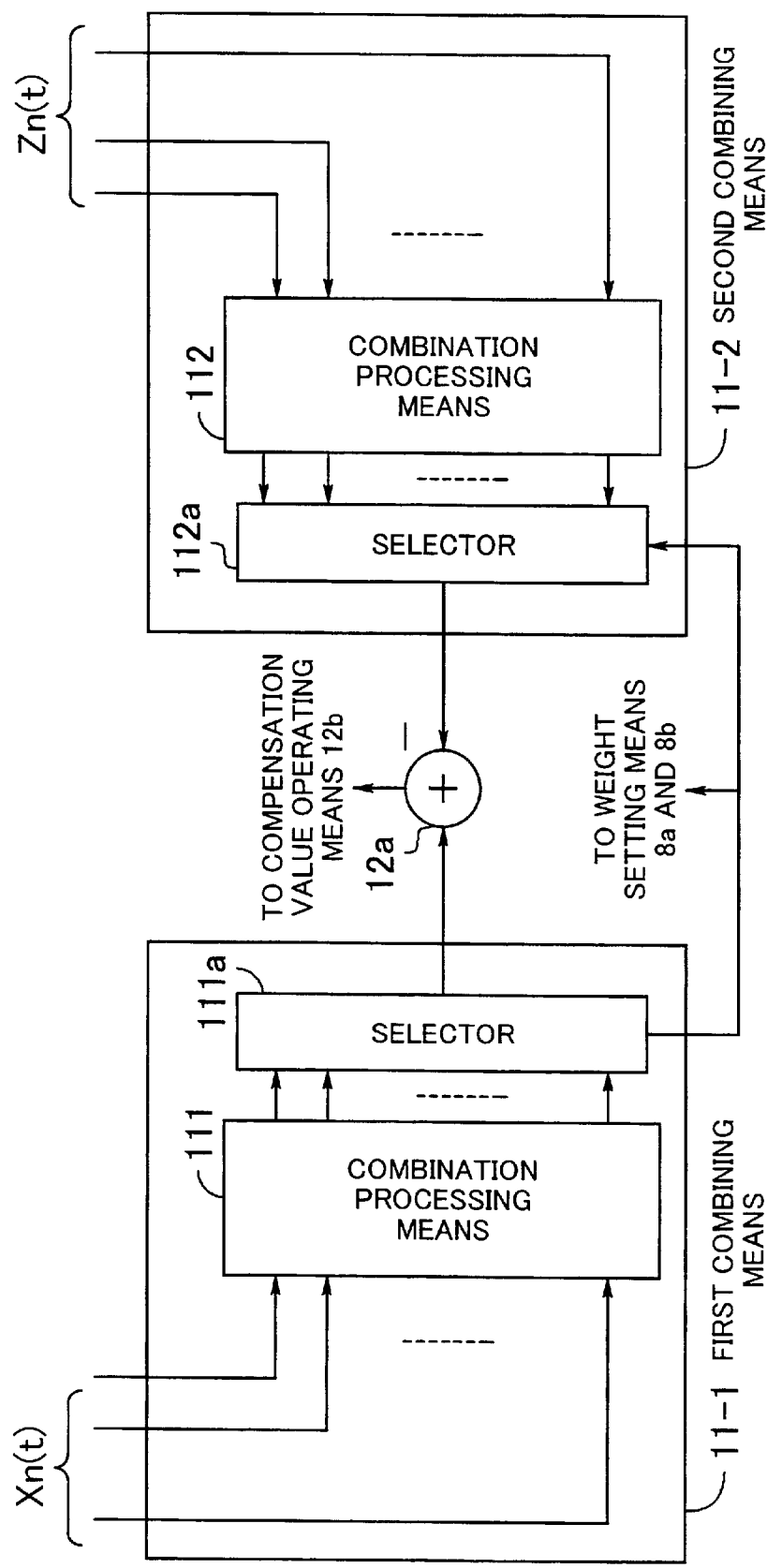
FIG. 10 is a view showing the structure of a third modification of the first and second combining means.

Now, a third modification of the first and second combining means 11-1 and 11-2 will be described. FIG. 10 is a view showing the structure of a third modification of the first and second combining means 11-1 and 11-2. Combination processing means 111 and 112 are combined circuits which a plurality of signals are input to and output from, and fast Fourier transform (FFT), Butler matrix, or the like will be applied.

A selector 111a selects, for example, a signal the level of which is the highest from among a plurality of combined signals output from the combination processing means 111 and outputs it to subtraction operating means 12a. Moreover, the selector 111a informs a selector 112a and weight setting means 8a and 8b of this information.

The selector 112a selects a combined signal corresponding to the combination processing means 111 from among a plurality of combined signals output from the combination processing means 112 on the basis of information given and outputs it to the subtraction operating means 12a.

As a result, any combined output can be selected from among a plurality of combining processes, resulting in a more flexible combining process.

Figure 11:
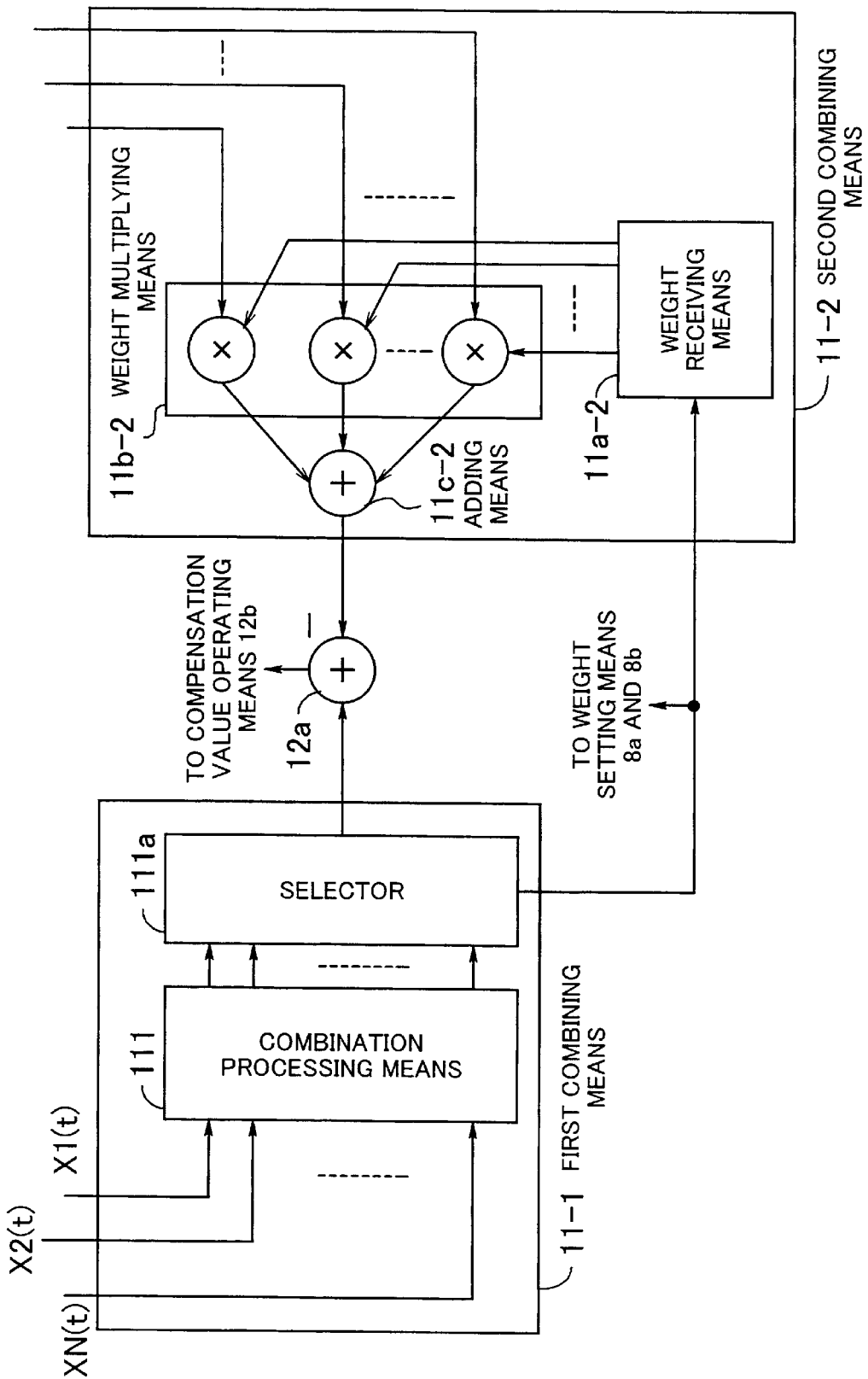
FIG. 11 is a view showing the structure of a fourth modification of the first and second combining means.

Now, a fourth modification of the first and second combining means 11-1 and 11-2 will be described. FIG. 11 is a view showing the structure of a fourth modification of the first and second combining means 11-1 and 11-2. In the fourth modification, the structure of first combining means 11-1 is based on the third modification shown in FIG. 10 and the structure of second combining means 11-2 is based on the first modification shown in FIG. 8.

By using this way circuits can be simplified. FIGS. 9 and 10 can also apply and the same effect will be obtained.

Figure 12:
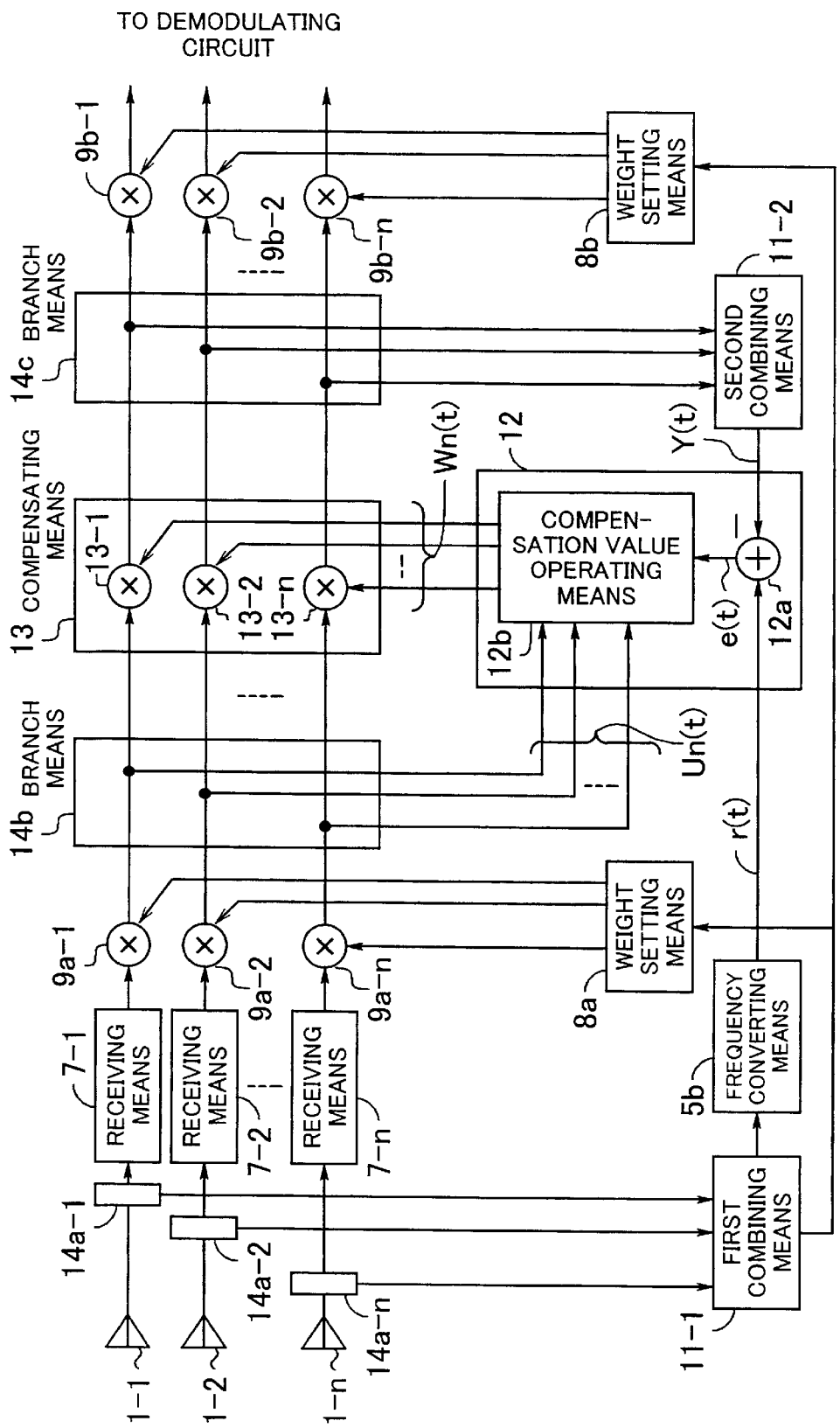
FIG. 12 is a view showing a sixth embodiment of the present invention.

Now, a sixth embodiment of the variation compensating unit 10 will be described. FIG. 12 is a view showing a sixth embodiment of the present invention. An uplink (receiving-system) array antenna system with a built-in variation compensating unit 10 is shown. The same means that was described above will be marked with the same number and descriptions of it will be omitted.

The sixth embodiment differs from the fourth embodiment shown in FIG. 5 in that multiplying means 9b-1 through 9b-n are located behind branch means 14c. As a result, second combining means 11-2 does not have to use the same combining method as first combining means 11-1. In this case, only a simple circuit for combining signals with the same phase and equal amplitude is needed. Moreover, it is not necessary for the first combining means 11-1 to give information to the second combining means 11-2.

The same effect will be obtained if weight setting means 8a and multiplying means 9a-1 through 9a-n locate at the input stages of receiving means 7-1 through 7-n. In that case, a multiplication process will be performed on RF signals.

Figure 13:
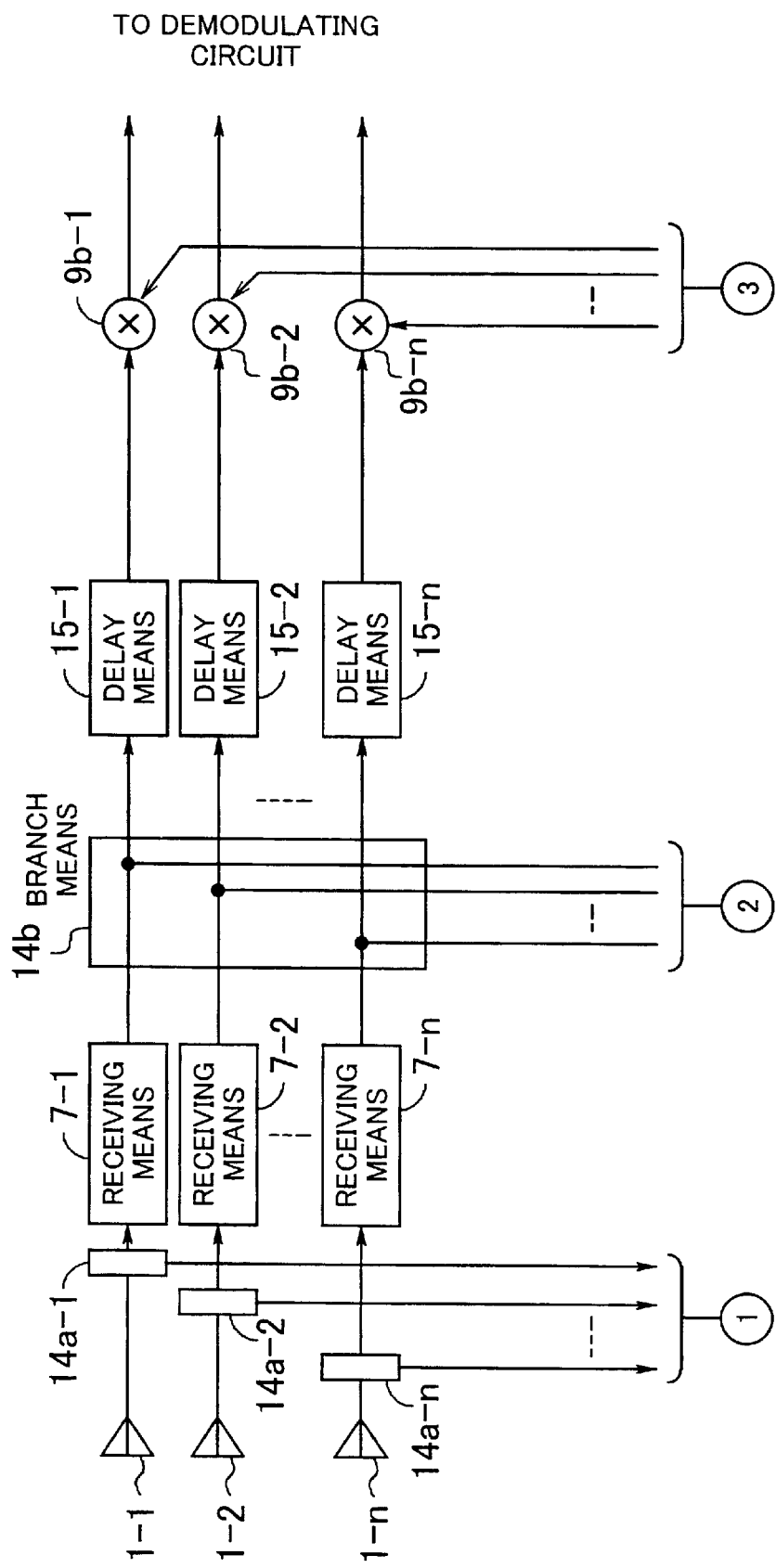
FIG. 13 is a view showing a seventh embodiment of the present invention.
Figure 14:
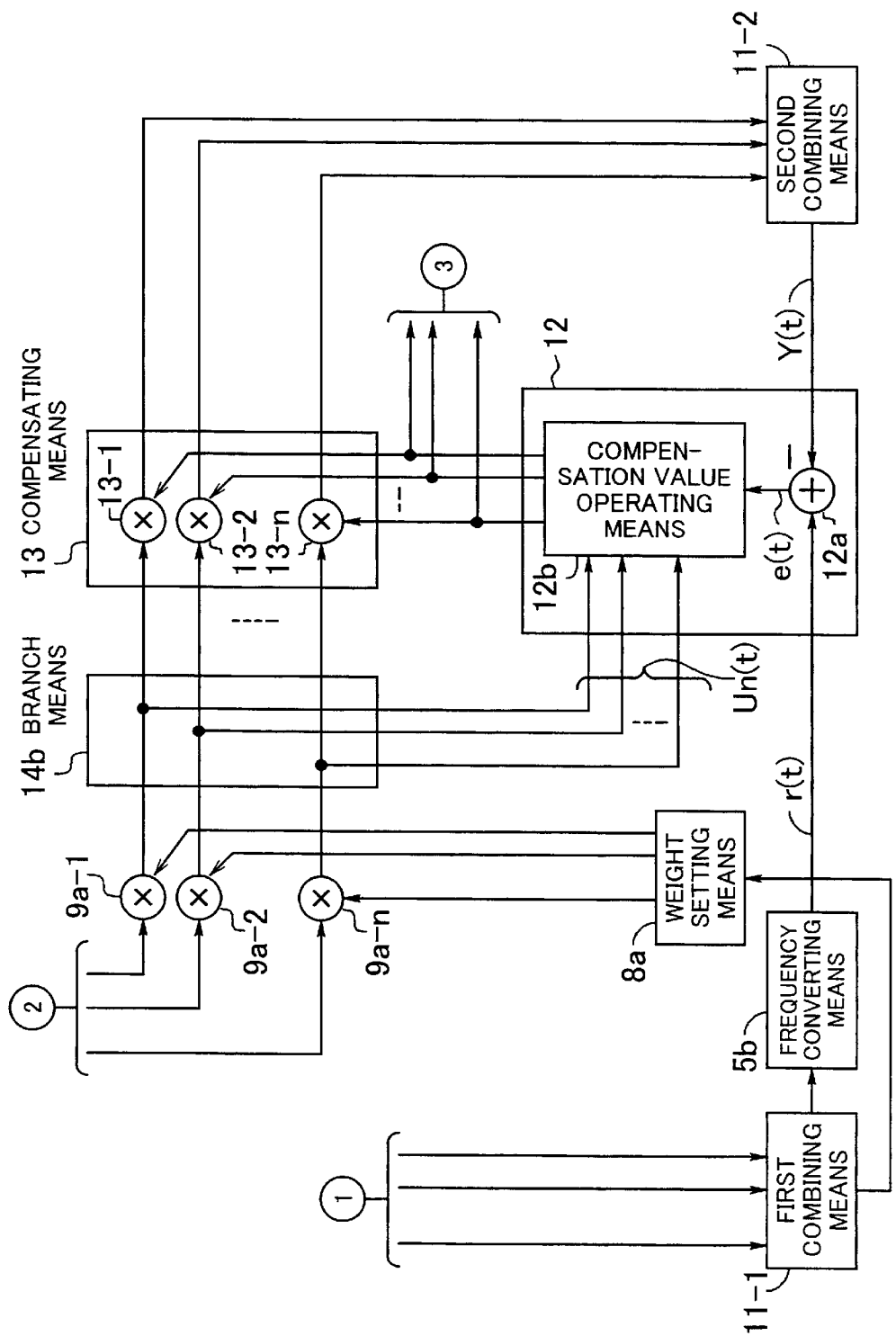
FIG. 14 is a view showing the seventh embodiment of the present invention.

Now, a seventh embodiment of the variation compensating unit 10 will be described. FIGS. 13 and 14 are views showing a seventh embodiment of the present invention. An uplink (receiving-system) array antenna system with a built-in variation compensating unit 10 is shown. The same means that was described above will be marked with the same number and descriptions of it will be omitted.

Directional couplers 14a-1 through 14a-n are located in front of receiving means 7-1 through 7-n respectively. Compensation values for variations which had occurred in signals are calculated through first combining means 11-1 and compensation value calculating means 12 and weights to be given to compensating means 13 are updated sequentially.

Furthermore, delay means 15-1 through 15-n are located behind branch means 14b. On each branch, being a main line, a signal passes through delay means 15-1 through 15-n. Multiplying means 9b-1 through 9b-n multiplies this signal and the same weight that was given to the compensating means 13 together to compensate an amplitude variation and phase variation.

Processing signals by the use of this branching method and using a simple circuit for combining signals with the same phase and equal amplitude as second combining means 11-2 will make weight setting means 8b unnecessary. In this case, it is impossible to locate the directional couplers 14a-1 through 14a-n at the output stages of the receiving means 7-1 through 7-n respectively.

Figure 15:
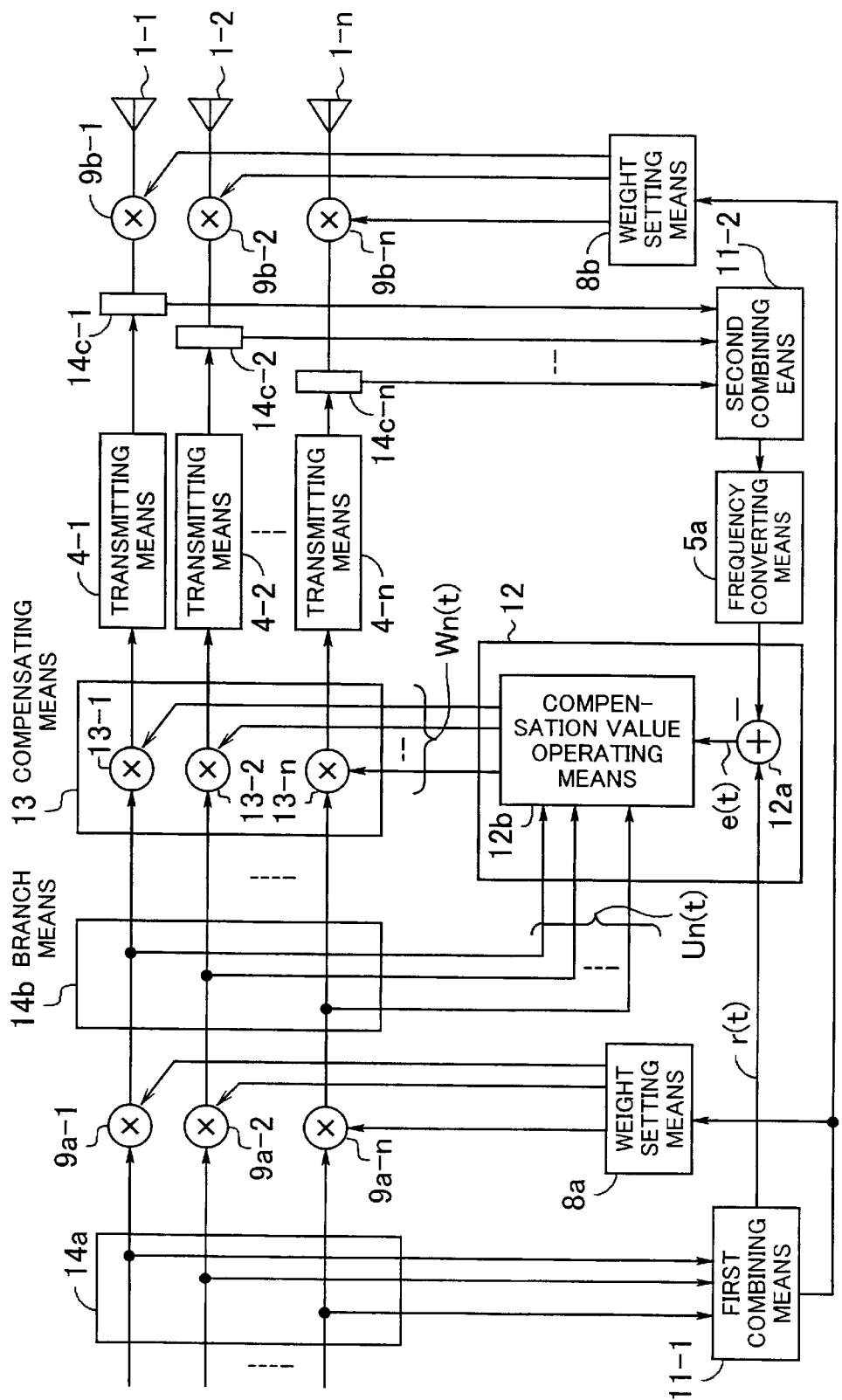
FIG. 15 is a view showing an eighth embodiment of the present invention.

Now, an eighth embodiment of the variation compensating unit 10 will be described. FIG. 15 is a view showing an eighth embodiment of the present invention. In the eighth embodiment, the sixth embodiment shown in FIG. 12 is applied to a transmitting-system array antenna system. Its basic structure and operation are the same with the sixth embodiment, so descriptions of them will be omitted.

Figure 16:
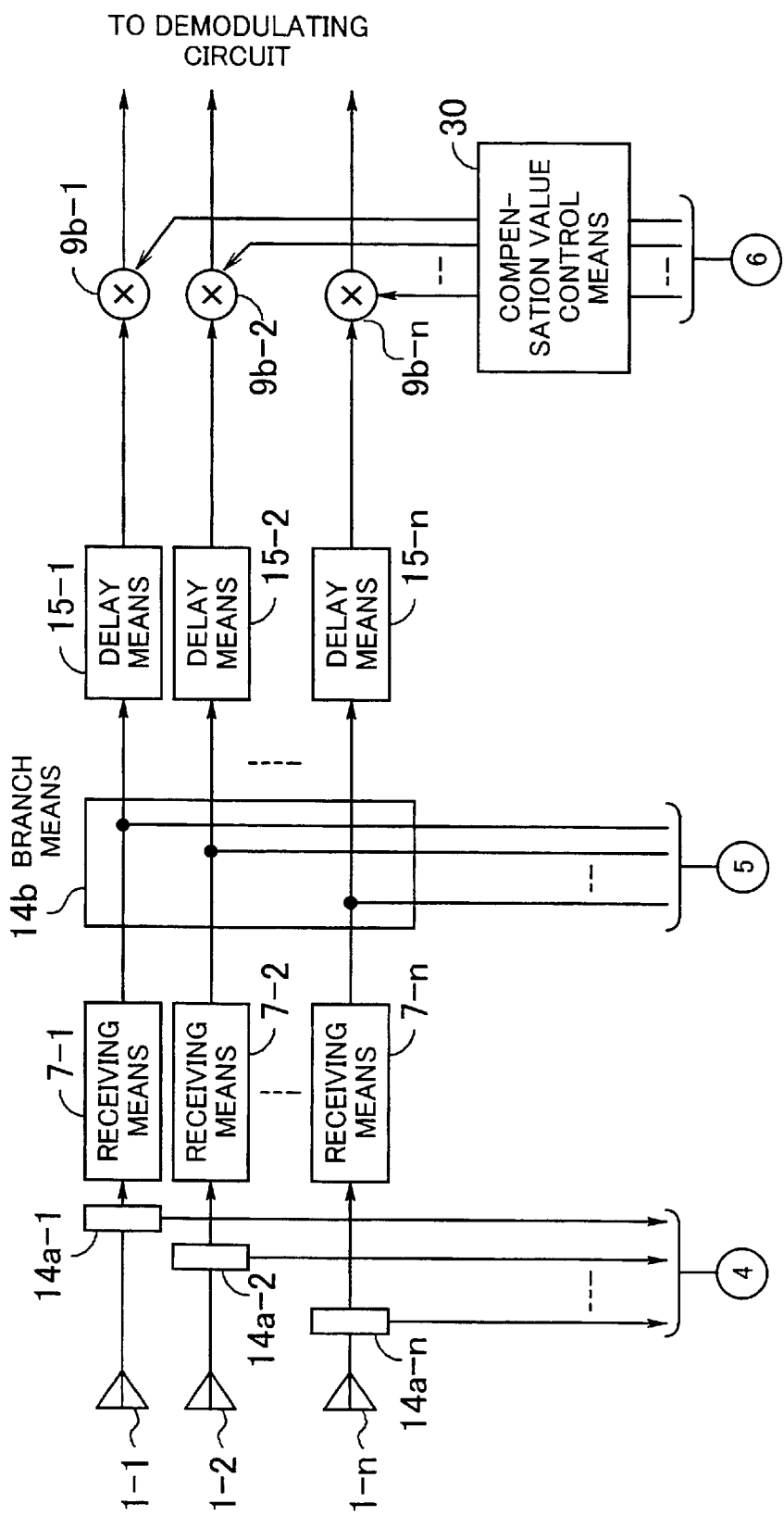
FIG. 16 is a view showing a ninth embodiment of the present invention.
Figure 17:
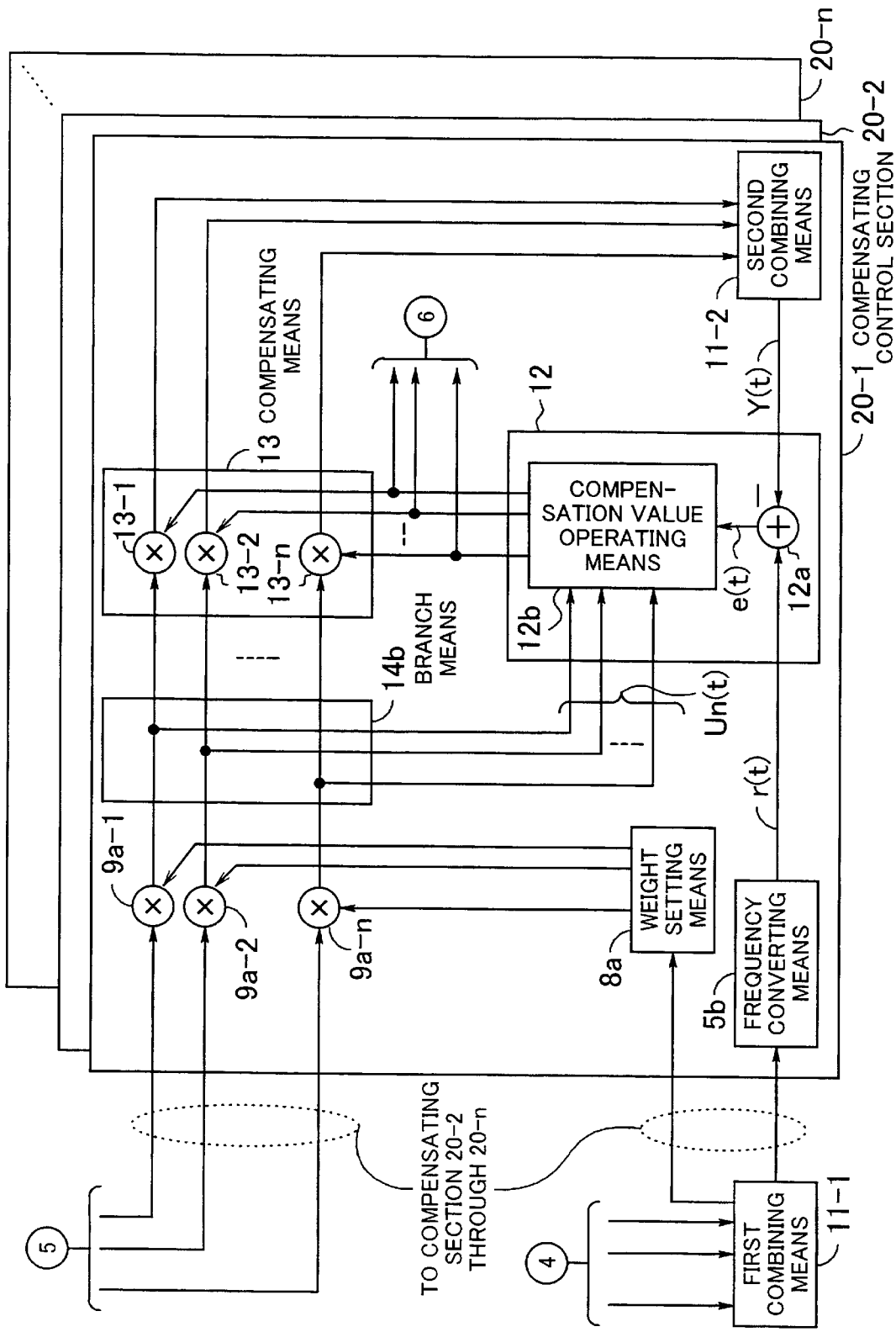
FIG. 17 is a view showing the ninth embodiment of the present invention.
Figure 18:
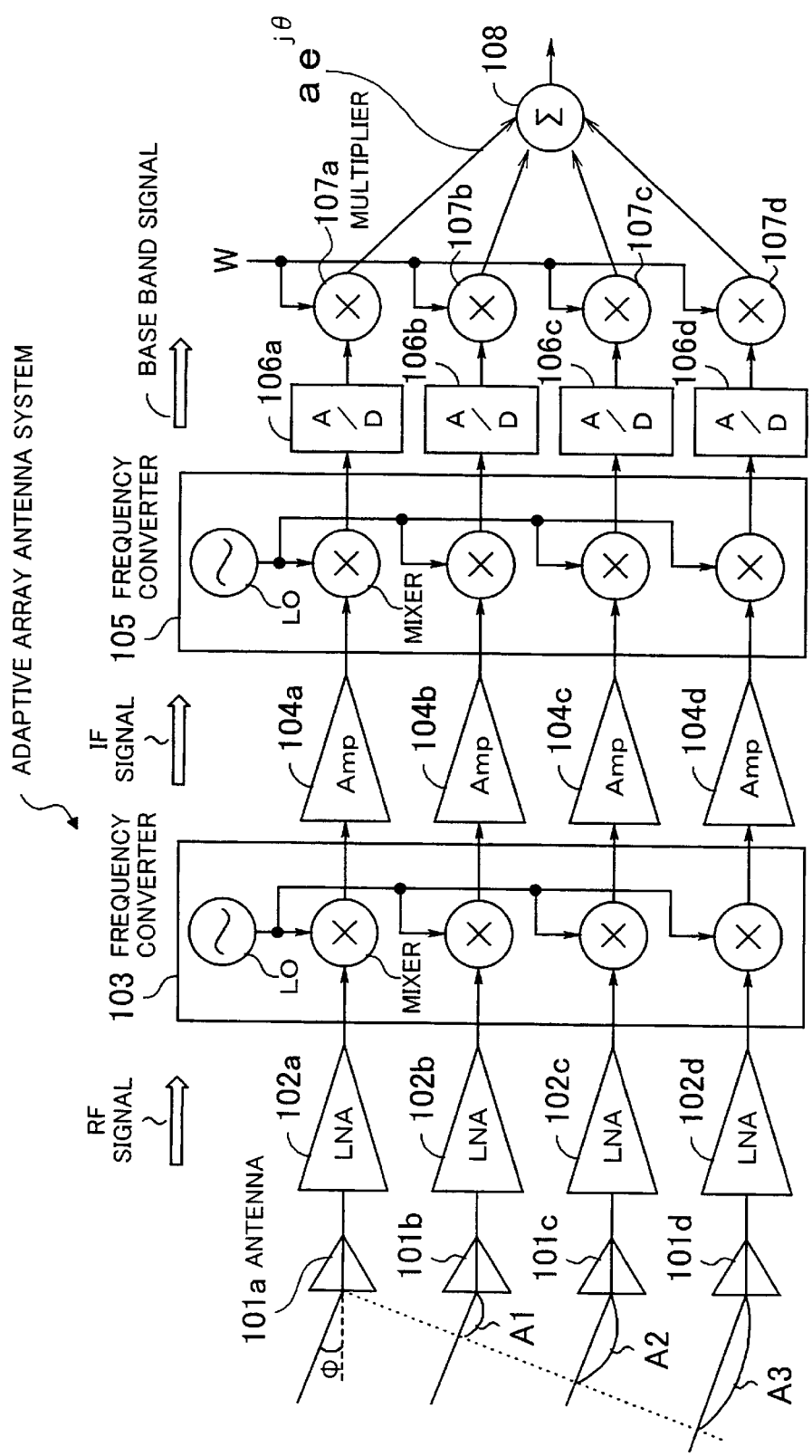
FIG. 18 is a schematic view showing the structure of a system using an adaptive array antenna.
Figure 19:
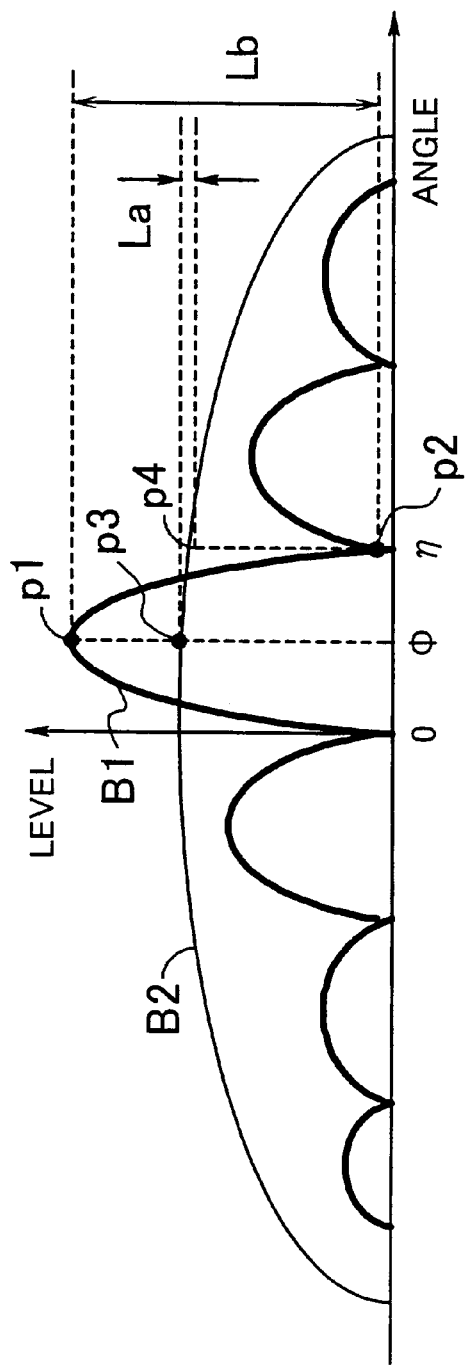
FIG. 19 is a view showing a beam pattern obtained by an array antenna.
Figure 20:
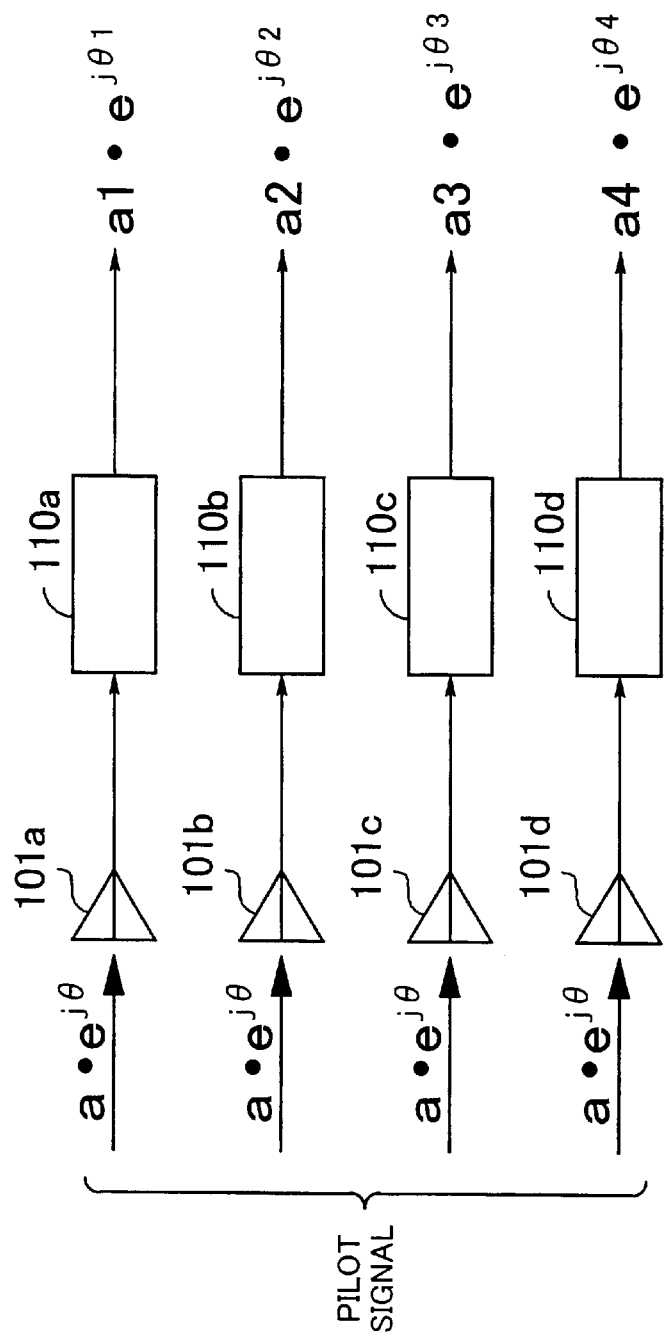
FIG. 20 is a view for describing the prior art.

Now, a ninth embodiment of the variation compensating unit 10 will be described. FIGS. 16 and 17 are views showing a ninth embodiment of the present invention. An uplink (receiving-system) array antenna system with a built-in variation compensating unit 10 is shown. The same means that was described above will be marked with the same number and descriptions of it will be omitted.

Signals in which a variation has not occurred branch off from branches at directional couplers 14a-1 through 14a-n. These signals are input to first combining means 11-1, for example, shown in FIG. 9 or 10 which has a plurality of combining methods. A plurality of compensating control sections 20-1 through 20-n have the same function and are located so that they correspond to output from a selector in the first combining means 111-1. Signals which branch at branch means 14b are also input to the compensating control sections 20-1 through 20-n.

Signals output from compensation value calculating means 12 in the compensating control sections 20-1 through 20-n are input to compensation value control means 30. Ultimately, the compensation value control means 30 calculates one value for variation compensation corresponding to each branch by performing the process of, for example, averaging these compensation values sent from the compensating control sections 20-1 through 20-n and outputs these averages to multiplying means 9b-1 through 9b-n.

Signals on main lines input to the multiplying means 9b-1 through 9b-n are delayed by delay means 15-1 through 15-n so that these delays correspond to delays caused by the processing of the compensating control sections 20-1 through 20-n and compensation value control means 30.

As a result, compared with compensating by the use of one compensation value, reliability is improved. That is to say, variation can be compensated more accurately.

As described above, the variation compensating unit 10 according to the present invention calculates a compensation value by processing sequentially with a combined signal on each transmission path, in which a variation has not occurred, as a reference signal and compensates an amplitude variation and phase variation.

As a result, dedicated pilot signals and a unit for generating them are unnecessary and dynamic variations can be dealt with in real time. Furthermore, the reliability of adaptive processing by the use of signals in which a variation has been compensated is high and efficient beam forming can be performed both for an uplink and for a downlink.

The variation compensating unit 10 according to the present invention therefore contributes greatly toward realizing a radio base station for a cellular mobile communication system in which a multiple beam antenna or adaptive array antenna is used in the digital area.

As has been described in the foregoing, the variation compensating unit according to the present invention calculates a compensation value for compensating variation on the basis of a first combined signal generated by combining signals on different transmission paths in which a variation has not occurred, a second combined signal generated by combining signals on the different transmission paths in which a variation has occurred, and a signal on each transmission path in which a variation has not occurred or in which a variation has occurred, and compensates variation on the basis of this compensation value. As a result, an amplitude variation and phase variation can be compensated efficiently and system reliability and communication quality can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A variation compensating unit for compensating variation including at least one of an amplitude variation and a phase variation which will occur in the case of transmitting signals via transmission paths, the unit comprising:
   a first combining section for generating a first combined signal by combining signals on different transmission paths in which the variation has not occurred;
   a second combining section for generating a second combined signal by combining signals on the different transmission paths in which the variation has occurred;
   a compensation value calculating section for calculating compensation values for compensating the variation according to the transmission paths on the basis of the first combined signal, the second combined signal, and the signals on the different transmission paths in which the variation has not occurred or in which the variation has occurred; and
   a compensating section for compensating the variation dynamically on the basis of the compensation values.

2. The variation compensating unit according to claim 1, wherein the first combining section and the second combining section perform the process of combining signals with equal amplitude and the same phase.

3. The variation compensating unit according to claim 1, wherein the second combining section performs a combination process by the use of the same combination weights that are used by the first combining section.

4. The variation compensating unit according to claim 1, wherein the compensating section compensates the variation by performing an operation process on signals on each of the transmission paths in which the variation has not occurred by the use of the compensation values.

5. The variation compensating unit according to claim 1, wherein the compensating section compensates the variation by performing an operation process on signals on each of the transmission paths in which the variation has occurred by the use of the compensation values.

6. The variation compensating unit according to claim 1, further comprising on each of the transmission paths:
   a multiplying section for giving any amplitude and phase rotation to the signal by multiplying the signal and a weight together; and
   an inverse operation section for performing an operation being the inverse of a multiplicative operation performed by the multiplying section.

7. The variation compensating unit according to claim 1, wherein the first combining section updates combination weights so that output obtained by combining signals on the different transmission paths in which the variation has not occurred will be higher than or equal to a certain level.

8. The variation compensating unit according to claim 7, wherein the multiplying section multiplies the signal and a combination weight being higher than or equal to a certain level together.

9. The variation compensating unit according to claim 7, wherein the second combining section combines signals on the different transmission paths in which the variation has occurred by the use of combination weights being higher than or equal to a certain level.

10. The variation compensating unit according to claim 1, wherein the first combining section includes a plurality of combining circuits with different combining methods and selects one of output from the plurality of combining circuits.

11. The variation compensating unit according to claim 10, wherein the multiplying section multiplies the signal and a weight used by the selected combining circuit together.

12. The variation compensating unit according to claim 10, wherein the second combining section includes a plurality of combining circuits with different combining methods and selects a combining circuit that performs the same process as a combining circuit selected by the first combining section performs.

13. The variation compensating unit according to claim 1, wherein the first combining section includes a combined circuit that a plurality of signals are input to and output from and selects one output signal.

14. The variation compensating unit according to claim 13, wherein the multiplying section multiplies the signal and a weight corresponding to selected output together.

15. The variation compensating unit according to claim 13, wherein the second combining section includes a combined circuit that a plurality of signals are input to and output from and selects the same output as the first combining section selects.

16. The variation compensating unit according to claim 1, further comprising a plurality of compensating control sections each including the compensation value calculating section and the compensating section for compensating the variation by the use of a plurality of compensation values.

17. The variation compensating unit according to claim 1, wherein the compensation value calculating section updates weight by sequential processing.

18. The variation compensating unit according to claim 1, further comprising a frequency converting section for making frequency bands for signals used for operations to calculate the compensation values the same.

* * * * *